US012558633B2

(12) United States Patent
Lai

(10) Patent No.: US 12,558,633 B2
(45) Date of Patent: Feb. 24, 2026

(54) METHOD AND APPARATUS FOR BROADCASTING SIGNAL IN GAME, ELECTRONIC DEVICE, AND STORAGE MEDIUM

(71) Applicant: NETEASE (HANGZHOU) NETWORK CO., LTD., Zhejiang (CN)

(72) Inventor: Jiahong Lai, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 265 days.

(21) Appl. No.: 18/264,433

(22) PCT Filed: Apr. 15, 2021

(86) PCT No.: PCT/CN2021/087473
§ 371 (c)(1),
(2) Date: Aug. 7, 2023

(87) PCT Pub. No.: WO2022/165991
PCT Pub. Date: Aug. 11, 2022

(65) Prior Publication Data
US 2024/0100446 A1 Mar. 28, 2024

(30) Foreign Application Priority Data
Feb. 8, 2021 (CN) .......................... 202110183448.1

(51) Int. Cl.
*A63F 13/87* (2014.01)
*A63F 13/537* (2014.01)
(52) U.S. Cl.
CPC ............ *A63F 13/87* (2014.09); *A63F 13/537* (2014.09)

(58) Field of Classification Search
CPC .............................. A63F 13/87; A63F 13/537
See application file for complete search history.

(56) References Cited

U.S. PATENT DOCUMENTS 5,730,603 A * 3/1998 Harless .................... G09B 7/04
434/308
5,880,731 A * 3/1999 Liles ..................... G06F 3/0481
345/473
(Continued)

FOREIGN PATENT DOCUMENTS

CN 108804013 A 11/2018
CN 110368691 A 10/2019
(Continued)

OTHER PUBLICATIONS

1st Office Action dated Jul. 26, 2021 of Chinese Application No. 202110183448.1.
(Continued)

*Primary Examiner* — Steve Rowland
(74) *Attorney, Agent, or Firm* — Qinghong Xu

(57) ABSTRACT
A method and apparatus for broadcasting a signal in a game, an electronic device, and a storage medium. The method comprises: displaying, on a user terminal, a user interface comprising at least one virtual control and at least one virtual character, wherein the at least one virtual control comprises a signal broadcast control, and the at least one virtual character comprising a master virtual character; and in response to a first touch operation for the signal broadcast control, providing different broadcast option sets on the user interface according to different sates of the master virtual character, wherein each of the different broadcast option sets comprises one or more broadcast options, and each broadcast option corresponds to one or more broadcast messages to be sent. The present invention provides a customized
(Continued)

signal broadcasting mechanism, such that the cost of communication between players is reduced.

19 Claims, 24 Drawing Sheets

(56)                    References Cited

U.S. PATENT DOCUMENTS

| | | | | |
|---|---|---|---|---|
| 6,064,383 A * | 5/2000 | Skelly | G06F 3/04845 | |
| | | | | 715/835 |
| 6,229,533 B1 * | 5/2001 | Farmer | G06N 3/006 | |
| | | | | 345/473 |
| 6,971,064 B2 * | 11/2005 | Chien | H04L 67/04 | |
| | | | | 709/205 |
| 7,386,799 B1 * | 6/2008 | Clanton | A63F 13/12 | |
| | | | | 715/861 |
| 2005/0223328 A1 * | 10/2005 | Ashtekar | H04N 21/235 | |
| | | | | 715/977 |
| 2005/0261032 A1 * | 11/2005 | Seo | A63F 13/825 | |
| | | | | 455/566 |
| 2006/0089543 A1 * | 4/2006 | Kim | G16H 40/63 | |
| | | | | 600/300 |
| 2007/0113181 A1 * | 5/2007 | Blattner | G06Q 10/107 | |
| | | | | 715/753 |
| 2007/0255807 A1 * | 11/2007 | Hayashi | H04L 67/535 | |
| | | | | 709/219 |
| 2008/0059570 A1 * | 3/2008 | Bill | G06F 40/58 | |
| | | | | 709/203 |
| 2009/0094517 A1 * | 4/2009 | Brody | G06Q 30/02 | |
| | | | | 715/706 |
| 2009/0177976 A1 * | 7/2009 | Bokor | G06F 3/011 | |
| | | | | 715/753 |
| 2009/0300525 A1 * | 12/2009 | Jolliff | H04M 1/72427 | |
| | | | | 715/764 |
| 2009/0307620 A1 * | 12/2009 | Hamilton, II | A63F 13/63 | |
| | | | | 715/764 |
| 2015/0182856 A1 | 7/2015 | Mays, III et al. | | |
| 2015/0350118 A1 * | 12/2015 | Yang | G06F 3/0237 | |
| 2017/0001112 A1 | 1/2017 | Gilmore et al. | | |
| 2017/0083506 A1 * | 3/2017 | Liu | G06F 40/30 | |
| 2017/0180276 A1 * | 6/2017 | Gershony | H04L 51/222 | |
| 2019/0043239 A1 * | 2/2019 | Goel | G06T 13/205 | |
| 2021/0362042 A1 * | 11/2021 | Shao | A63F 13/822 | |

FOREIGN PATENT DOCUMENTS

| | | |
|---|---|---|
| CN | 110841284 A | 2/2020 |
| CN | 111228802 A | 6/2020 |
| CN | 111298436 A | 6/2020 |
| CN | 111760267 A | 10/2020 |

OTHER PUBLICATIONS

International Search Report dated Dec. 3, 2021 of International Application No. PCT/CN2021/087473.

* cited by examiner

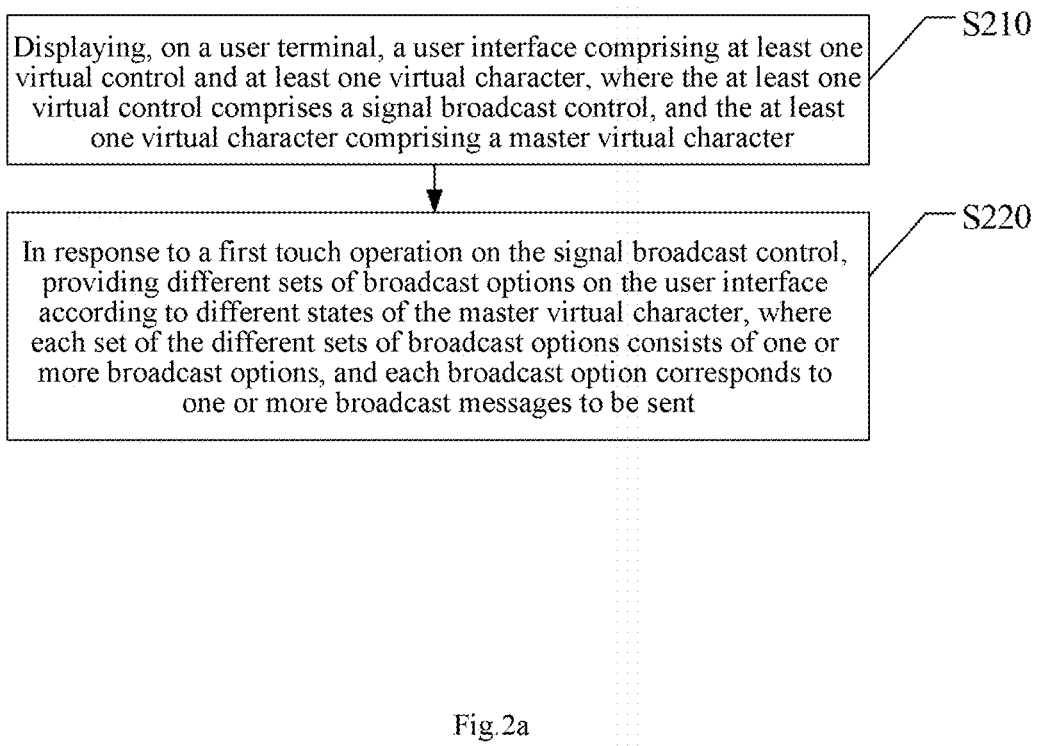

Displaying, on a user terminal, a user interface comprising at least one virtual control and at least one virtual character, where the at least one virtual control comprises a signal broadcast control, and the at least one virtual character comprising a master virtual character

S210

In response to a first touch operation on the signal broadcast control, providing different sets of broadcast options on the user interface according to different states of the master virtual character, where each set of the different sets of broadcast options consists of one or more broadcast options, and each broadcast option corresponds to one or more broadcast messages to be sent

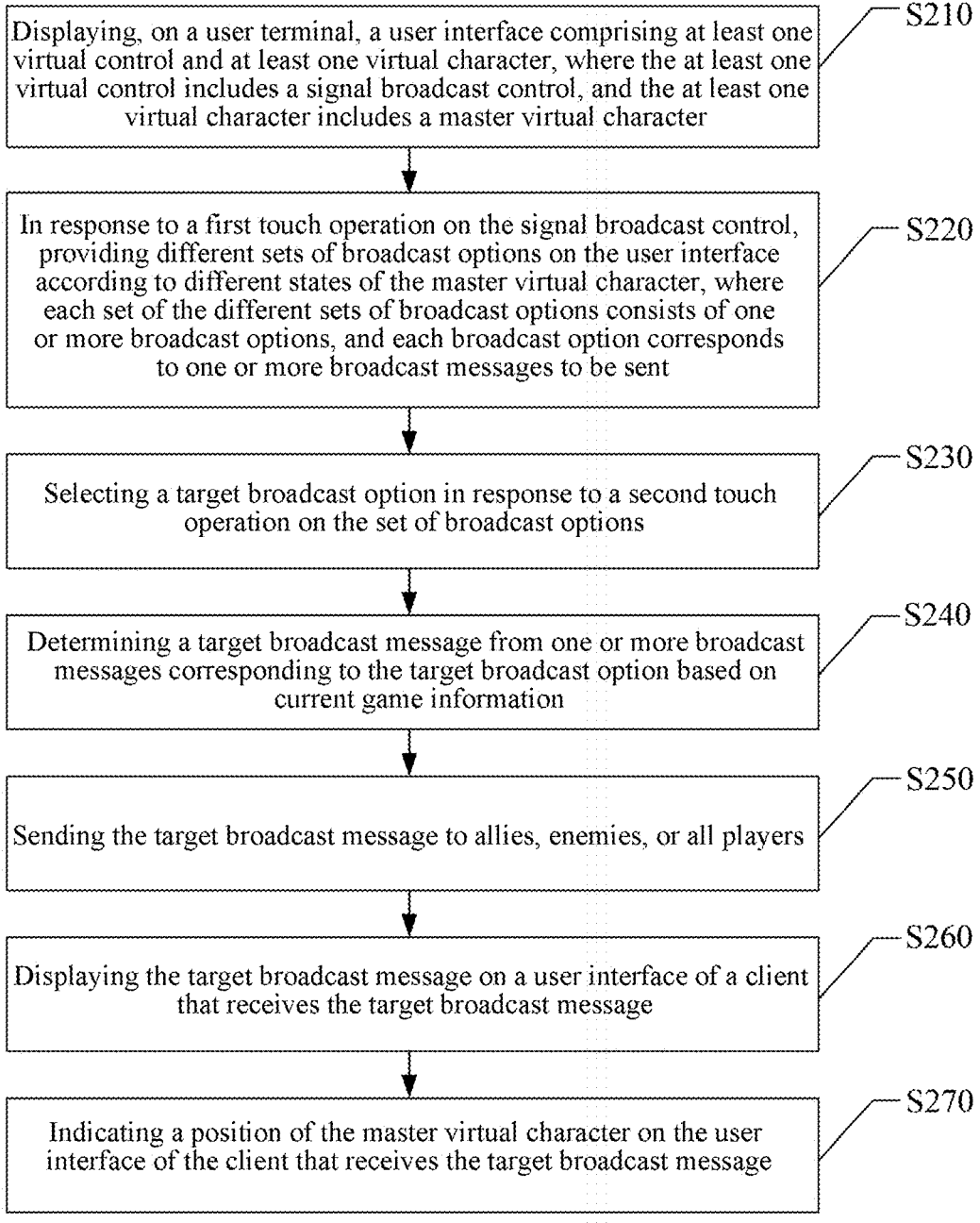

S210

Displaying, on a user terminal, a user interface comprising at least one virtual control and at least one virtual character, where the at least one virtual control includes a signal broadcast control, and the at least one virtual character includes a master virtual character

S220

In response to a first touch operation on the signal broadcast control, providing different sets of broadcast options on the user interface according to different states of the master virtual character, where each set of the different sets of broadcast options consists of one or more broadcast options, and each broadcast option corresponds to one or more broadcast messages to be sent

S230

Selecting a target broadcast option in response to a second touch operation on the set of broadcast options

S240

Determining a target broadcast message from one or more broadcast messages corresponding to the target broadcast option based on current game information

S250

Sending the target broadcast message to allies, enemies, or all players

S260

Displaying the target broadcast message on a user interface of a client that receives the target broadcast message

S270

Indicating a position of the master virtual character on the user interface of the client that receives the target broadcast message

Fig.2b

AA: The cat is near me
BB: Close
CC: Items found
DD: Signal broadcast operation area AA:Active skill             EE:Items found
BB:My items                FF:Weapon skill
CC:The cat is near me     GG:My knowledge cards
DD:Close                  HH:Signal broadcast operation area AA:The cat is near me
BB:Close
CC:Items found
DD:Signal broadcast operation area AA:The condition is not met, the broadcast failed AA:Caught by the cat          DD:The cat changed tying
BB:Struggling progress        EE:The cat is tied to the old rocket
CC:Close                      FF:Signal broadcast operation area AA:There is a mousetrap
BB:There is no mousetrap
CC:The cat is near me
DD:Close EE:The cat is not around
FF:My knowledge cards
GG:Signal broadcast operation area 900a Apparatus for broadcasting a signal in a game

910

Display module

920

Provision module

1100

Program

METHOD AND APPARATUS FOR BROADCASTING SIGNAL IN GAME, ELECTRONIC DEVICE, AND STORAGE MEDIUM

CROSS REFERENCE TO RELATED APPLICATION(S)

The present disclosure is a 35 U.S.C. 371 national phase application of PCT International Application No. PCT/CN2021/087473 filed on Apr. 15, 2021, which claims the priority of the Chinese patent application with an application number of 202110183448.1, titled by "Method and Apparatus for Broadcasting Signal in Game, Electronic Device, and Storage Medium", and filed on Feb. 8, 2021, the entire contents of both are incorporated herein by reference.

TECHNICAL FIELD

The present disclosure relates to the field of human-computer interactions, in particular, to a method and an apparatus for broadcasting a signal in a game, an electronic device, and a computer-readable storage medium.

BACKGROUND

With the rapid development of mobile terminals and communication technologies, various types of game applications have emerged on mobile terminals. For example, in multiplayer online competitive games, players, especially teammates, usually need to use voice or text to communicate online, so as to cooperate with each other to achieve a common goal. Signal broadcast is an effective communication mechanism in the games. That is, several buttons for signal broadcast (for example, "attack", "gather", "rescue", "retreat", etc.) are provided at the user terminal for selection.

It should be noted that the information disclosed in the above background section is only used to enhance understanding of the background of the present disclosure, and therefore may include information that does not constitute the relevant technology known to those of ordinary skills in the art.

SUMMARY

Other features and advantages of the present disclosure will become apparent from the following detailed description, or will be learned in part by practice of the present disclosure.

According to an aspect of the present disclosure, a method for broadcasting a signal in a game is provided. The method includes: displaying a user interface including at least one virtual control and at least one virtual character on a terminal, where the at least one virtual control includes a signal broadcast control, and the at least one virtual character includes a master virtual character; and providing different sets of broadcast options on the user interface according to different states of the master virtual character in response to a first touch operation on the signal broadcast control, where each set of the different sets of broadcast options comprises one or more broadcast options, and each broadcast option corresponds to one or more broadcast messages to be sent.

According to another aspect of the present disclosure, there is provided an electronic device, including: a processor; and a memory for storing processor-executable instructions. The processor is configured to execute the processor-executable instructions to perform any one of the above methods for broadcasting a signal in a game.

According to still another aspect of the present disclosure, a computer-readable storage medium is provided. A computer-executable program is stored in the computer-readable storage medium. When the computer-executable program is loaded and executed by a processor, any one of the above the methods for broadcasting a signal in a game is performed.

It is to be understood that both the foregoing general description and the following detailed description are exemplary and explanatory only and are not restrictive of the present disclosure.

BRIEF DESCRIPTION OF THE DRAWINGS

The accompanying drawings herein, which are incorporated into and form part of the specification, illustrate embodiments consistent with the present disclosure, and are used in conjunction with the specification to explain the principles of the present disclosure. Apparently, the drawings in the following description are only some embodiments of the present disclosure, and those skilled in the art may obtain other drawings according to these drawings without creative efforts.

FIG. 2 schematically shows a flowchart of a method for broadcasting a signal in a game according to some embodiments of the present disclosure;

DETAILED DESCRIPTION OF THE EMBODIMENTS

Figure 1:
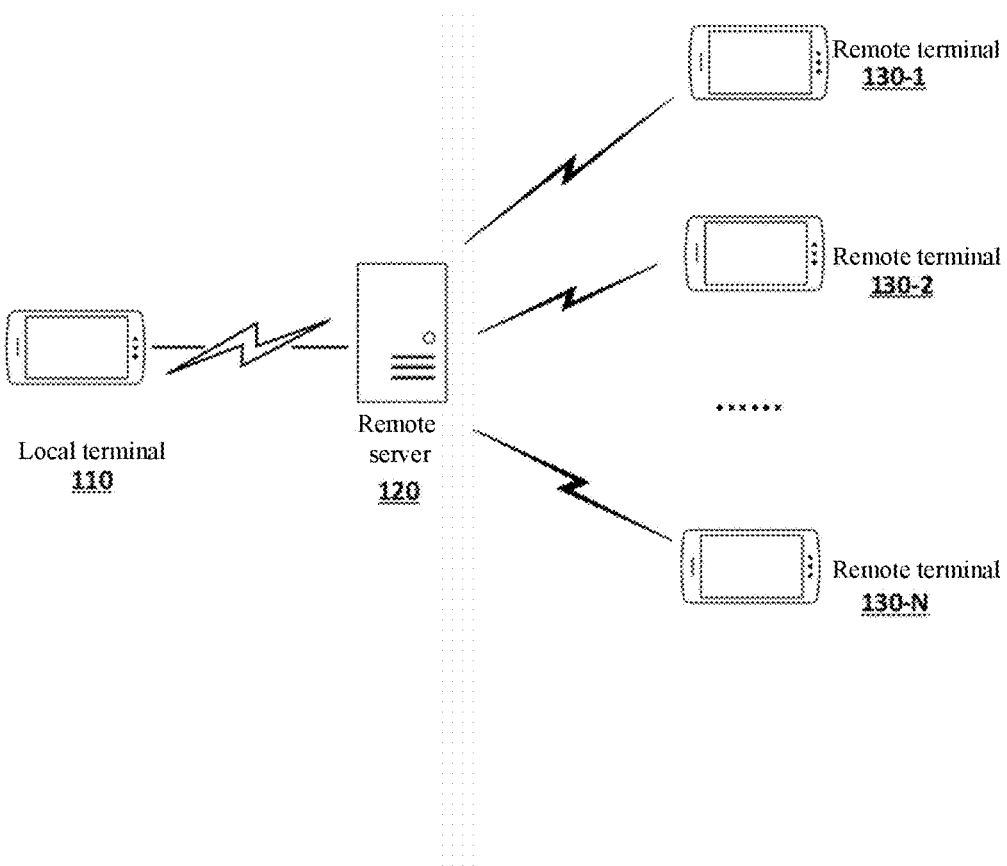
FIG. 1 schematically shows a schematic diagram of an application scenario according to an embodiment of the present disclosure.

Example embodiments will now be described more fully with reference to the accompanying drawings. Example embodiments may, however, be embodied in many forms and should not be construed as limited to embodiments set forth herein. Rather, these embodiments are provided so that the present disclosure will be thorough and complete, and will fully convey the concept of example embodiments to those skilled in the art. The same reference numerals denote the same or similar components in the drawings, and thus their repeated descriptions will be omitted.

It should be noted that the terms "first", "second" and "third" in the specification, claims, and the above-mentioned drawings of the present disclosure are used to distinguish similar objects and are not necessarily used to describe specific objects, specific orders, or sequences. It is to be understood that the terms so used are interchangeable under appropriate circumstances so that embodiments of the present disclosure described herein may be implemented in sequences other than those shown or described herein. In addition, the terms "including," "comprising," and "having," and any variations thereof, are intended to cover non-exclusive inclusion. For example, processes, methods, apparatuses, products or devices including a series of steps or units are not necessarily limited to those steps or units explicitly listed, but may include other steps or units not explicitly listed or inherent to those processes, methods, products, or devices.

Furthermore, the described features, structures, or characteristics may be combined in any suitable manner in one or more embodiments. In the following description, numerous specific details are provided in order to give a thorough understanding of embodiments of the present disclosure. However, those skilled in the art will appreciate that the technical solutions of the present disclosure may be practiced without one or more of the specific details, and other methods, components, materials, apparatuses, steps, etc. may be employed. In other instances, well-known structures, methods, apparatuses, implementations, materials, or operations are not shown or described in detail to avoid obscuring aspects of the present disclosure.

The block diagrams shown in the drawings are merely functional entities and do not necessarily correspond to physically separate entities. That is, these functional entities may be implemented in software. Alternatively, these functional entities, or part of them may be implemented in one or more software-hardened modules. Further alternatively, these functional entities may be implemented in different networks and/or processor apparatuses and/or microcontroller apparatuses.

First of all, some terms involved in the present disclosure are explained as follows.

Virtual Environment indicates the virtual environment displayed (or provided) when the application program is running on the terminal. The virtual environment may be a simulation environment of the real world, a semi-simulation and semi-fictional three-dimensional environment, or a purely fictional three-dimensional environment. The virtual environment may also be any one of a two-dimensional virtual environment and a three-dimensional virtual environment. In some embodiments, the virtual environment is also used for virtual environment battles between at least two virtual characters, and there are virtual resources available for use by the at least two virtual characters in the virtual environment.

Virtual Character refers to a movable object in the virtual environment. The movable object may be at least one of a virtual character, a virtual animal, and an anime character. In some embodiments, when the game scene is a three-dimensional virtual world, the virtual character may be a three-dimensional model. Each virtual character has its own shape and volume in the three-dimensional virtual world, and occupies a partial space of the three-dimensional virtual world. In some embodiments, the virtual character is a three-dimensional character constructed based on the three-dimensional human skeleton technology, and different appearance images may be realized for the virtual object by wearing different skins. In some implementations, the virtual character may also be implemented using a 2D model, which is not limited in embodiments of the present disclosure. In one or more embodiments of the present disclosure, a master virtual character may refer to a virtual character that may be controlled by a user player to act in a virtual environment.

Field of View refers to the field of view of the master virtual character captured by the virtual camera in the virtual environment, where the camera is set relative to the master virtual character, and the virtual environment in the field of view is displayed on the user interface of the terminal. For example, the virtual camera may be set above the back of the virtual character or 45 degrees obliquely above to capture the third-person perspective of the virtual character in a downward posture, or may be set as the eyes of the virtual character to capture its first-person perspective, or may be set on the side of the virtual character to capture the side perspective of the virtual character in the two-dimensional virtual environment. The position of the virtual camera is usually associated with the position of the virtual character.

Multiplayer Online Competition means that on the map provided by the virtual environment, there are at least two virtual teams operating independently and competing for a certain victory condition as the goal. The victory condition includes but is not limited to: occupying a stronghold or destroying the enemy faction's stronghold, killing the virtual character of the enemy faction, ensuring own survival or escape within a specified scene and time, grabbing a certain resource, scoring more than the opponent or reaching a certain threshold within a specified time. Tactical competitions may be conducted on a game by game basis, and the map of each game for the tactical competitions may be the same or different. Each virtual team includes one or more virtual characters, such as 1, 2, 3, 4 or 5.

Reference may be made to FIG. 1, which shows a schematic diagram of an application scenario according to an embodiment of the present disclosure. As shown in FIG. 1, the application scenario involves the following instances: a local terminal 110; a remote server 120 connected to the local terminal 110 via a wired manner and/or wireless manner, where the remote server 120 and the local terminal 110 are peers to each other; and remote terminals 130-1, 130-2, . . . , 130-N connected to the remote server 120 in the same way or in different ways, respectively, where the remote terminals 130-1, 130-2, . . . , 130-N and the remote server 120 are other peers. In one or more embodiments, the local terminal 110 may communicate in real time with one or more remote terminals 130 via the remote server 120.

Both the local terminal 110 and the remote terminal 130 are installed with and run a client that supports the virtual environment, and the client may be a multiplayer online battle program. When the terminal 110 and/or the terminal 130 run the client, the user interface of the client 111 is displayed on the screen of the first terminal 110. The client may be any one of a strategy game, a military simulation program, a MOBA game, a battle royale shooting game, and a role-playing game. In various clients, user players may manipulate the virtual character (i.e., master virtual character) to perform various virtual actions, such as moving, running, getting down, crouching, jumping, flying, driving, picking up, looting, attacking, defending, rescuing, etc. In addition, the virtual character may have multiple states in a specific client or game, and the types of states vary according to the type of client or game. For example, in a shooting game, the state of the virtual character belongs to the type of combat state, which includes but not limited to: skydiving, actionable, dying, and death. For another example, in a strategy game, the state of the virtual character belongs to the type of survival state, which includes but not limited to: scouting, healthy, fell to the ground, captured, tied up, decrypted, and escaped. For still another example, in MOBA games, the status of virtual characters belongs to stage status, which includes but not limited to: development period, dragon fighting period, tower attacking period, tower guarding period. It should be noted that the switch between different states of the virtual character may be triggered actively or passively.

In some embodiments, the local terminal 110 is the terminal used by the first user player. The first user player uses the local terminal 110 to control the activities of the first virtual character located in the virtual environment. The first virtual character may be referred to as the first user's master virtual character, such as a mouse or a cat. Actions of the first virtual character include, but are not limited to, jumping, crawling, walking, running, picking up, aiming, attacking, throwing, carrying cheese, pushing cheese, eating, rescuing, and tying rockets. The state of the first virtual character (e.g., mouse) includes, but is not limited to: scouting (using a robot mouse), actionable, unconscious, caught by a cat, tied to a rocket. Schematically, the first virtual character is a first virtual object, such as a simulated character or an anime character.

In some embodiments, the first virtual character and the second virtual character may be in the same virtual environment. In some embodiments, the first virtual character and the second virtual character may belong to the same camp, the same team, the same organization, have friendship, or have temporary communication privileges. In some embodiments, the first virtual character and the second virtual character may belong to different camps, different teams, different organizations, or have a hostile relationship.

In some embodiments, the clients installed on the local terminal 110 and the remote terminal 130 are the same, or the clients installed on the two terminals are clients of the same type on different operating system platforms (for example, Android or IOS). The local terminal 110 may generally refer to one of the multiple terminals, and the remote terminal 130 may generally refer to the other of the multiple terminals. This embodiment only takes the local terminal 110 and the remote terminal 130 as an example for illustration. The local terminal 110 and the remote terminal 130 may belong to the same or different device types, which include but are not limited to: smartphones, tablets, portable gaming devices, e-book readers, portable music players, TVs, set-top boxes, game consoles, laptop computers, and desktop computers.

The techniques described herein may be supported by various configurations of the terminal 110 and the terminal 130, and are not limited to specific examples of the techniques described herein. The terminal 110 and the terminal 130 may also interact with various servers 120. In an embodiment, the server 120 may be implemented by an independent server or a server cluster composed of multiple servers. In another embodiment, the server 120 may be deployed as a cloud to execute applications and/or data that may be used during computer processing. The server 120 may connect terminal 110, terminal 130 and other computing devices with abstracted resources and functions.

In various embodiments, the server 120 includes a processor, a user account database, a battle service module, and a user-oriented input/output interface (not shown). The processor is configured to load the instructions stored in the server, and process the data in the user account database and the battle service module. The user account database is configured to store the data of the user account used by the terminal 110 and the terminal 130, such as the avatar of the user account, the nickname of the user account, the combat power index of the user account, and the service area where the user account is located. The battle service module is configured to provide multiple battle rooms to users for battling, such as one-to-one, many-to-many, one-to-many battles, etc. The user-oriented input/output interface is configured to establish communication and exchange data with the terminal 110 and/or terminal 130 via a wireless network or a wired network. In some embodiments, the server is provided with a message transceiving module, which is configured to implement the method for broadcasting a signal in a game provided in the following embodiments.

The Applicant in this case has found the following deficiencies in the solutions of the related technologies during the long research and development process.

The current communication mechanism used for signal broadcast may be too limited and mechanized, and may not be able to convey the information expected by the player to the outside world in such a short period of time. For example, regardless of the current state of the master virtual character controlled by the player or how it changes, there is a fixed and single signal broadcast option for the player to select. For another example, the system will only output a fixed broadcast message based on the signal broadcast option selected by the player, and will not automatically output a customized broadcast message according to the current game conditions for the signal broadcast option selected by the player.

According to one or more embodiments of the present disclosure, a method for broadcasting a signal in a game is provided. It should be noted that the steps shown in the flowcharts of the accompanying drawings may be implemented in a computer system such as a set of computer-executable instructions. Although a logical order is shown in the flowcharts, in some cases, the steps shown or described herein may be performed in an order different from that shown or described herein.

According to the method for broadcasting a signal in a game according to one or more embodiments of the present disclosure, the method may include the following steps, as shown in FIG. 2*a*.

In Step S210, a user interface including at least one virtual control and at least one virtual character is displayed on a user terminal, where the at least one virtual control includes a signal broadcast control, and the at least one virtual character includes a master virtual character.

In Step S220, in response to a first touch operation on the signal broadcast control, different sets of broadcast options are provided on the user interface according to different states of the master virtual character, where each set of the different sets of broadcast options comprises one or more broadcast options, and each broadcast option corresponds to one or more broadcast messages to be sent.

In some embodiments, the method may also include the following steps, as shown in FIG. 2*b*.

In Step S230, a target broadcast option is determined in response to a second touch operation on the broadcast options set.

In Step S240, a target broadcast message is determined from one or more broadcast messages corresponding to the target broadcast option based on current game information.

In Step S250, the target broadcast message is sent to allies, enemies, or all players.

In Step S260, the target broadcast message is displayed on a user interface of a client that receives the target broadcast message.

In Step S270, a position of the master virtual character is indicated on a user interface of a client that receives the target broadcast message.

It should be understood that the method flowchart shown in FIG. 2 is only an example, and the execution sequence and necessity of each step therein are not limited thereto. For example, a certain step(s) may not necessarily exist, or a certain step(s) may be performed in parallel with other steps.

In the following, each step of the method for broadcasting a signal in a game in some embodiments will be further described.

Figure 3A:
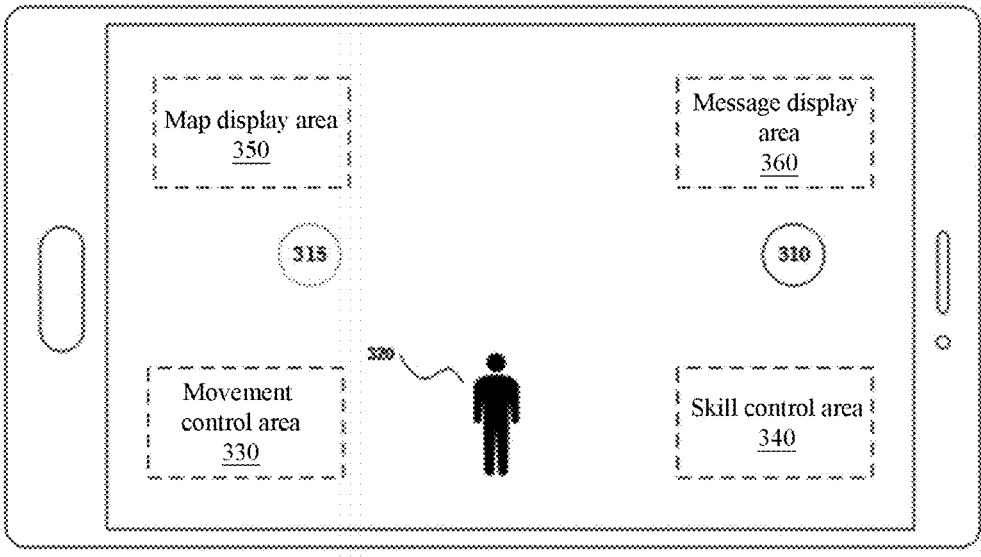
FIG. 3 is a schematic diagram of a user interface of a user terminal according to some embodiments of the present disclosure.
Figure 3B:
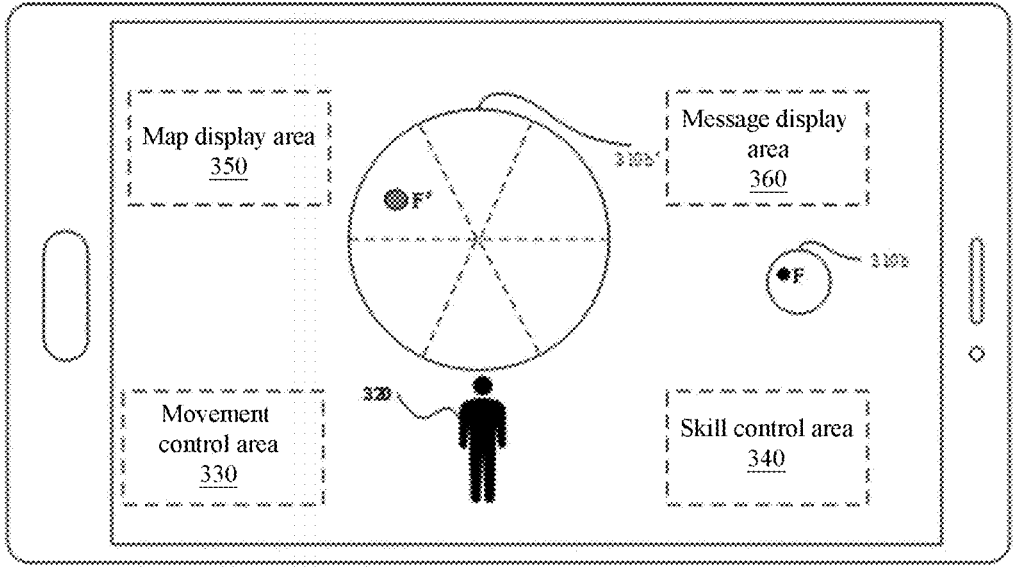
Figure 3C:
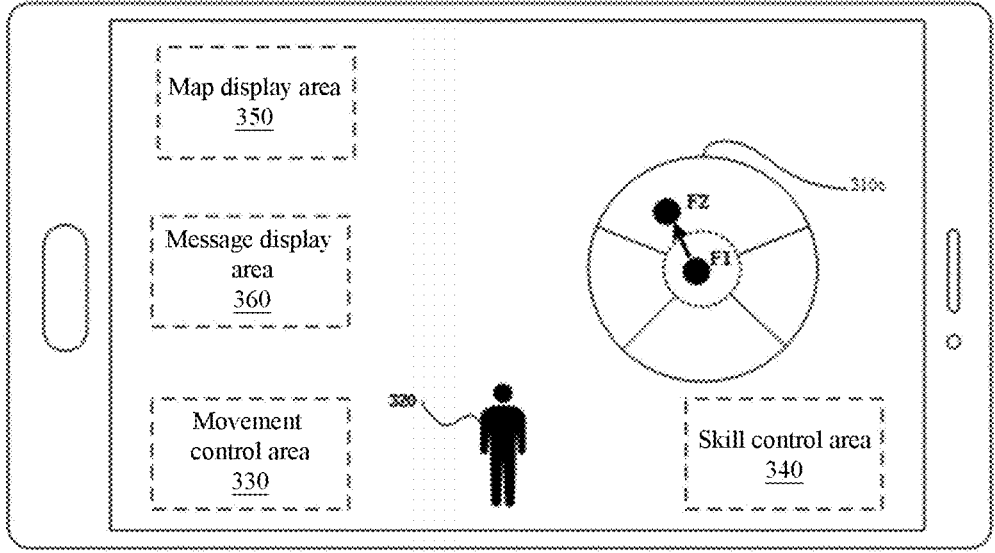

FIGS. 3*a*-3*c* are schematic diagrams of user interfaces of a user terminal in some embodiments of the present disclosure. As shown in FIG. 3*a*, in some embodiments of the present disclosure, the user interface may include, but not limited to, a virtual character 320 and one or more virtual characters (not shown, including allies and/or enemies) within the field of view of the virtual character 320 in the virtual environment, a movement control area 330 (e.g., a virtual joystick control or virtual direction keys), a skill control area 340 (including one or more virtual skill buttons), a map display area 350 (e.g., a tactical mini-map), a message display area 360 (e.g., a chat dialog), and a virtual control 310 and/or a virtual control 315.

It should be noted that the above areas and controls are not limited to the layout shown in FIG. 3, but may be added, canceled and/or positioned at any position of the user interface according to different layout settings of the server or client user.

In Step S210, a user interface including at least one virtual control and at least one virtual character is displayed on a user terminal, where the at least one virtual control includes a signal broadcast control, and the at least one virtual character includes a master virtual character.

In an embodiment, the virtual character 320 may be a master virtual character, which may be controlled by the user player at the local terminal.

In an embodiment, the virtual control 310 and/or the virtual control 315 may be signal broadcast controls.

In an embodiment, the signal broadcast control may be located in one or more areas of the user interface, and embodies the same function. In one embodiment, the signal broadcast control 310 may be provided on the right side of the user interface, such that it is suitable to be touched by the right hand. In another embodiment, when an event is triggered (e.g., the state of the master virtual character changes), the signal broadcast control 315 may be provided on the left side of the user interface, the signal broadcast control 310 may be canceled, or the signal broadcast control 310 may remain provided, making it suitable to use the left hand for touching the signal broadcast control 315. For example, if the game state of the main virtual character switches from "actionable" to "dying", it is necessary to use the right hand to call for help, struggle, or perform other skill operations, and the right hand may not be vacated to touch the signal broadcast control 310 located on the right side of the screen. At this time, however, the left hand may be vacated to touch the signal broadcast control 315 located on the left side of the screen because there is no need to perform movement control by the left hand, so that subsequent operations of the signal broadcast can be performed.

In an embodiment, the signal broadcast control may have a predetermined maximum number of usages and indicate a remaining number of usages.

Specifically, the remaining number of usages is increased by one after a predetermined period in response to the remaining number of usages being greater than or equal to zero and less than the predetermined maximum number of usages; and the signal broadcast control is disabled until the predetermined period is reached in response to the remaining number of usages being equal to zero. In one embodiment, the maximum number of usages of the signal broadcast control is 3, then the control in the initial state may display "3" to indicate that the remaining number of usages is 3. Each time the control is touched, the remaining number of usages decreases, until the function of the control is disabled when it reaches to 0. The remaining number of usages is incremented every predetermined period (e.g., seconds) until the maximum number of usages (i.e., 3 times of usages) is reached. In another embodiment, if the maximum number of usages is 1, the predetermined period may be regarded as a cooling time (e.g., 10 seconds). After each usage of the function of the signal broadcast control, it is necessary to wait for the cooling time to expire before continuing to use the function of the control.

In Step S220, in response to a first touch operation on the signal broadcast control, different sets of broadcast options are provided on the user interface according to different states of the master virtual character, where each set of the different sets of broadcast options comprises one or more broadcast options, and each broadcast option corresponds to one or more broadcast messages to be sent.

In an embodiment, as shown in FIGS. 3*b* and 3*c*, step S220 further includes: providing a signal broadcast wheel on the user interface, where each cell (i.e., each sector divided in the wheel) in the signal broadcast wheel corresponds to each of the one or more broadcast options. In addition to the signal broadcast wheel, other forms may also be used to reflect the broadcast options set, e.g., option list pop-up window.

In an embodiment, the first touch operation and the second touch operation are continuous touch operations. It should be noted that the touch operations may be touch operations performed by fingers on the graphical user interface, such as clicking, touching, pressing, dragging, and sliding, or may be a combination of two or more different operations performed simultaneously. For example, the first touch operation may be a touching operation on the signal broadcast control, and the second touch operation may be a sliding operation to prevent the finger from leaving the screen following the touching operation. In one or more embodiments, in response to the first touch operation, the signal broadcast control may be registered as the mapping operation area 310*b* in FIG. 3*b* and the signal broadcast wheel (e.g., wheel mapping area 310*b*' in FIG. 3*b*, which will be explained in detail later) may be called out, or the signal broadcast control may be directly registered as the signal broadcast wheel (e.g., wheel operation area 310*c* in FIG. 3*c*, which will be explained in detail later). In one or more embodiments, the second touch operation may occur at the signal broadcast control 310 or at any location in any direction of the area 310*b*/310*c* where the signal broadcast control is expanded.

When the broadcast options set is embodied as the signal broadcast wheel in FIG. 3*b* or FIG. 3*c*, each of the broadcast options in the set of broadcast options may correspond to a respective one of the cells in the signal broadcast wheel, and the number of cells may change with each update of the signal broadcast wheel.

In an embodiment, step S220 further includes: in response that a set of broadcast options corresponding to a first state of the master virtual character is provided on the user interface and that the master virtual character switching from the first state to a second state, stopping providing the set of broadcast options; and re-providing a set of broadcast options corresponding to the second state of the master virtual character on the user interface in response to the first touch operation on the signal broadcast control again.

For example, when the main virtual character is in the "actionable" state and the user player touches the signal broadcast control, the signal broadcast wheel corresponding to the state is then called out. The signal broadcast wheel contains the appropriate signal broadcast options for the user player to choose and matching with the "actionable" state. While calling out the signal broadcast wheel by the user player, if the master virtual character's state changes (e.g., from "actionable" to "dying" due to an attack), the wheel will be turned off immediately. When the user player calls out the signal broadcast wheel again, the corresponding signal broadcast wheel will be provided according to the current state (i.e., the dying state) of the virtual character, which may be different from the previously called signal broadcast wheel, because it contains other signal broadcast options that matches with the "dying" state and are suitable for the user player to select.

According to the above-mentioned embodiments of the present disclosure, highly customized, rather than default, signal broadcast options can be provided according to different states of the master virtual character.

In step S230, the target broadcast option is determined in response to the second touch operation on the set of broadcast options.

In an embodiment, as shown in FIG. 3b, the second touch operation is a mapping operation, and step S230 further includes: registering the signal broadcast control 310 as a mapping operation area 310b and registering the signal broadcast wheel as a wheel mapping area 310b' on the user interface. The touch point F of the mapping operation may be adjusted in the mapping operation area 310b, and may be synchronously mapped to the mapping point F' in the wheel mapping area 310b', so that the position of the mapping point F' relative to the wheel mapping area 310b' maintains a mapping relationship with the position of the touch point F relative to the mapping operation area 310b. Then, the target broadcast option in the signal broadcast wheel may be determined through the release position of the mapping operation. That is, the mapping point F' finally stays at a broadcast option corresponding to a certain cell.

In an embodiment, as shown in FIG. 3c, the second touch operation is a pointing operation, and step S230 further includes: receiving the pointing operation on the user interface to determine the target broadcast option in the signal broadcast wheel, where the signal broadcast wheel is registered as the wheel operation area 310c, the sliding start point F1 of the pointing operation starts from the signal broadcast control, and the sliding end point F2 of the pointing operation is any cell corresponding to the target broadcast option in the signal broadcast wheel.

In Step S240, the target broadcast message is determined from one or more broadcast messages corresponding to the target broadcast option based on current game information.

In one or more embodiments, the game information may refer to information displayed on the user interface, such as: skill name, skill level, cooling time, other virtual characters within the field of view (including their skills, items, status, etc.). Game information may also refer to information recorded in the background but not displayed on the user interface, such as the percentage corresponding to the progress bar and information outside the field of view.

The specific implementation about determining the target broadcast message according to the game information may include various manners, e.g., through the artificial intelligence in the game, through the behavior tree, and through determination of the broadcast conditions illustrated in FIGS. 4-8 below. Intelligent determination is made according to the game information, and the target broadcast message can be automatically determined from one or more broadcast messages corresponding to the broadcast option without the player's secondary operation, thereby realizing the convenience of signal broadcast and the diversity of broadcast messages.

In an embodiment, step S240 includes: determining whether one or more preset broadcast conditions are satisfied according to the game information, and determining the target broadcast message from the one or more broadcast messages corresponding to the target broadcast option based on a satisfaction situation of the one or more broadcast conditions.

In an embodiment, the determining the target broadcast message from the one or more broadcast messages corresponding to the target broadcast option based on the satisfaction situation of the one or more broadcast conditions further includes: selecting a broadcast message for which all the broadcast conditions are satisfied from the one or more broadcast messages as the target broadcast message.

In an embodiment, step S240 further includes: acquiring preset broadcast data from the game information according to broadcast requirements of the target broadcast message, and writing the broadcast data and/or broadcast content corresponding to the broadcast data into the target broadcast message.

The above steps will be further elaborated in FIGS. 4-8 in conjunction with specific embodiments.

In Step S250, the target broadcast message is sent to allies, enemies, or all players.

in some embodiments, the target broadcast message may be sent to the allies only, so that the system may find out several signal broadcast options that best match with the current state for the user player according to different states of the virtual character controlled by the user player, thereby enabling them to communicate and share information accordingly. Thus, the efficient and accurate communication within the team is enabled, and interactions between teammates are enhanced. In some embodiments, a target broadcast message, such as a taunting message or an informative message, may be sent to the enemies. In some embodiments, it is also possible to send target broadcast messages to the outside world that may be received by both the enemies and allies or multiple factions.

In Step S260, the target broadcast message is displayed on the user interface of the client that receives the target broadcast message.

In some embodiments, the target broadcast message may be displayed in the message display area 360 of the user interface. In some embodiments, values in the target broadcast message that need to be read from the client or server are highlighted or colored. In some embodiments, the avatar, ID number, and the target broadcast message sent out by the master virtual character are displayed above the master virtual character or other predetermined area of the user interface, so as to confirm to the user player that the target broadcast message has been sent out. If the broadcast conditions are not met, a notification of broadcast failure is displayed.

In Step S270, the position of the master virtual character is indicated on the user interface of the client that receives the target broadcast message.

In some embodiments, the location of the virtual character that is broadcasting a signal may be indicated in the map display area 350 of the user interface. In some embodiments, the map display area 350 may be embodied as a mini-map. Generally speaking, a minimap is a map used for assisting players in determining their positions in a virtual environment, where virtual characters, surrounding terrain, allies units or structures, enemies, important locations or items are all elements displayed in the mini-map.

corresponds to a different text, as shown in the following table:

TABLE 1

| # | Chracter state | Broadcast option 1 | Broadcast option 2 | Broadcast option 3 | Broadcast option 4 | Broadcast option 5 | Broadcast option 6 |
|---|---|---|---|---|---|---|---|
| 1 | Controlling the robot mouse | The cat is near me | Items found | | | | |
| 2 | Actionable | The cat is near me | My items | Items found | Active skill | Weapon skill | My knowledge cards |
| 3 | Weak | The cat is near me | Items found | | | | |
| 4 | Caught by the cat | Caught by the cat | Struggling progress | The cat changed tying | The cat is tied to old rocket | | |
| 5 | Tied to the rocket | The cat is near me | The cat is not around | There is a mousetrap | There is no mousetrap | My knowledge cards | |

Next, the inventive concept of the present disclosure will be further elaborated by taking a mobile game as an example. FIGS. 4-8 schematically illustrate schematic diagrams of the user interfaces applied to the game in some embodiments of the present disclosure.

The following is a brief description of the rules or winning conditions of this game.

The 5 members of the mouse team cooperate with each other to play the game. In the early stage, they control the robot mice to scout the map scene, locate the cheese, and prepare for carrying the cheese. In the middle stage, they push a certain amount of cheese into the designated mouse hole. In the late stage, they open the wall crack to escape. The one member of the cat team destroys the robot mice and sets traps, i.e., mouse traps, in the early stage. In the middle stage, it catches the mice to prevent the mice from carrying the cheese, ties them to rockets after capturing them, and releases them. In the late stage, it continues to catch the mice, tie them to rockets, and release them to prevent them from escaping.

The rules of victory and defeat are as follows. If the cat team successfully releases 3 mice, then it wins the game. At the end of the game time, if the mouse team fails to escape 2 members, the cat team wins. If the mouse team escapes 2 members by opening the wall crack, the mouse team gets the team victory.

Figure 4A:
FIG. 4 to FIG. 8 schematically illustrate schematic diagrams of user interfaces applied to the a game according to some embodiments of the present disclosure.
Figure 4B:
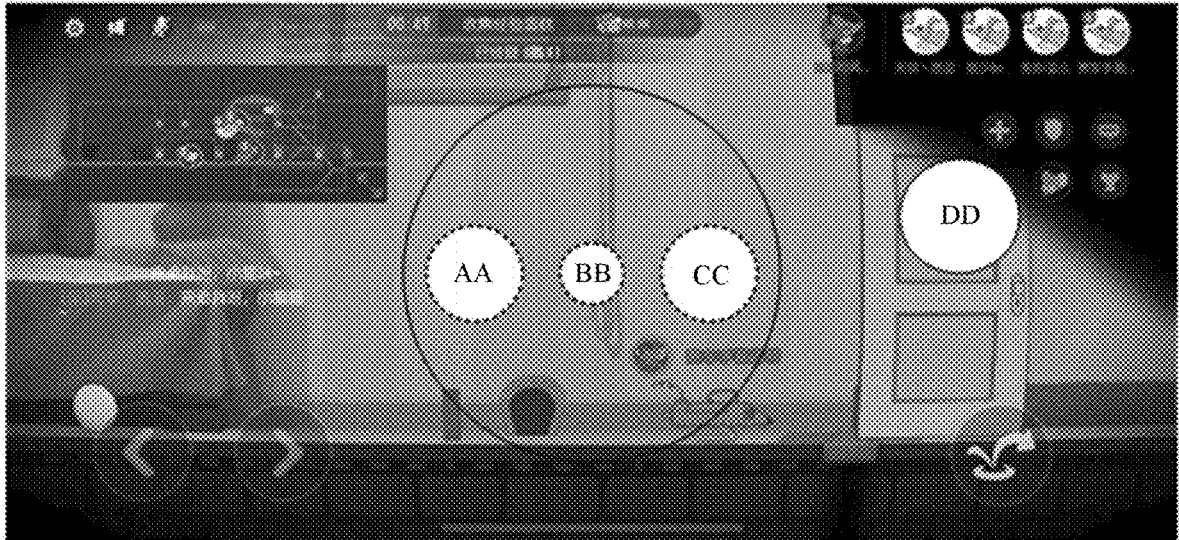

One or more embodiments of the present disclosure may be applicable to signal broadcast among multiple team members of the mouse team. Each member of the mouse team may be one of the virtual characters controlled by each player, and its character state in the game includes the following: "controlling the robot mouse", "actionable", "weak", "caught by the cat", and "tied to the rocket". In the related art, no matter which state the master virtual character is in, there are only two fixed broadcast options: "help" and "retreat". According to various embodiments of the present disclosure, on one hand, different target broadcast information can be determined through the selection of fixed broadcast options based on the current state of the virtual character and the current game information, and on the other hand, it is also possible to provide the user player with a set of broadcast options in the user interface by touching the signal broadcast control, where the set of broadcast options dynamically updates or changes according to the current state of the virtual character, and the set of broadcast options includes one or more broadcast options, each of which FIG. 4 shows a schematic diagram of providing a corresponding set of broadcast options according to a first state of the virtual character according to one or more embodiments of the present disclosure. As shown in FIG. 4a, the current state (i.e., the first state) of the master virtual character (in the dotted box position) is "controlling the robot mouse". When the signal broadcast control on the user interface is touched, as shown in FIG. 4b, the signal broadcast control will be registered as the signal broadcast operation area (i.e., the mapping operation area), and the signal broadcast wheel will be provided as the set of broadcast options (i.e., the wheel mapping area) in the center portion of the user interface, which contains two signal broadcast options corresponding to the state of "controlling the robot mouse", i.e., "The cat is near me" and "Items found".

Figure 5A:
Figure 5B:
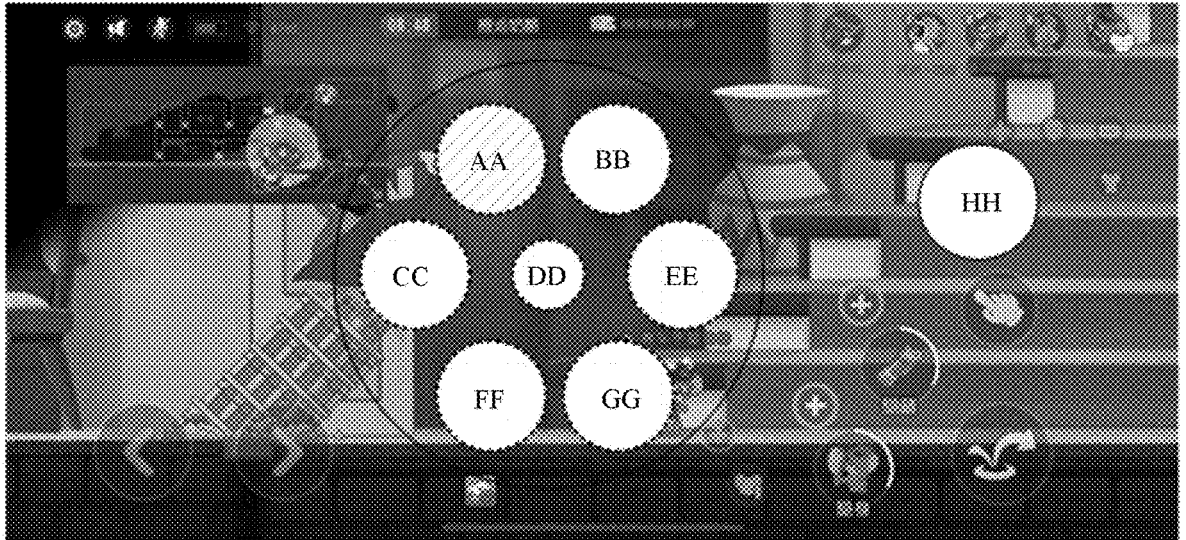

FIG. 5 shows a schematic diagram of providing a corresponding set of broadcast options according to a second state of the virtual character according to one or more embodiments of the present disclosure. As shown in FIG. 5a, the current state (i.e., the second state) of the master virtual character (in the dotted box position) is "actionable". When the signal broadcast control on the user interface is touched, as shown in FIG. 5b, the signal broadcast control will be registered as the signal broadcast operation area (i.e., the mapping operation area), and the signal broadcast wheel (i.e., the wheel mapping area) will be provided in the center portion of the user interface, which contains six signal broadcast options corresponding to the state of "actionable", i.e., "The cat is near me", "My items", "Items found", "Active skill", "Weapon skill" and "My knowledge cards".

In one or more embodiments of the present disclosure, there may be one or more broadcast messages corresponding to each broadcast option. For example, the broadcast messages corresponding to "The cat is near me" include: "The cat may be invisible near me", "The cat is near me", "The cat has items [name]" (need to read the item information), or "The cat has skill [name]" (need to read skill information). The broadcast messages corresponding to "active skills" include: "My active skill is not learned", "My active skill [level] is ready" (need to read skill information), or "My active skill [level] is available after [cooling time]" (need to read skill information and cooling time). The broadcast message corresponding to "struggling progress" includes: "I have struggled [percentage]" (need to read the struggling progress bar".

When the user player selects the corresponding broadcast option (i.e., the target broadcast option), the system or server will determine the target broadcast message from one or more broadcast messages corresponding to the target broadcast option according to the current game information (e.g., the current broadcast condition). In some embodiments, there may be one or more broadcast conditions associated with each broadcast option, and the one or more broadcast conditions refer to the game conditions under which the broadcast message can be broadcast. In some embodiments, for certain broadcast options, the target broadcast messages corresponding to those broadcast options may be sent unconditionally (i.e., in the absence of a broadcast condition). In some embodiments, when there are multiple broadcast messages corresponding to the broadcast option, one of the multiple broadcast messages may be determined as the target broadcast message according to the satisfaction situation of one or more broadcast conditions. In some embodiments, for a target broadcast message corresponding to the broadcast option, the target broadcast message can be sent only if all the broadcast conditions associated therewith are satisfied. Otherwise, a broadcast failure is prompted.

When the target broadcast message is determined, for the case that there are broadcast requirements for some target broadcast messages, i.e., the broadcast data (such as item information, skill information, cooling time, progress bar) needs to be read from the client or server, preset broadcast data is acquired from current game information according to these broadcast requirements. Then, the broadcast data and/ or broadcast content corresponding to the broadcast data is written into the target broadcast message, and finally the target broadcast message is sent.

Taking one of the states of the virtual character—"actionable", as an example, the following table illustrates the relationship among broadcast options, one or more broadcast conditions, broadcast messages, and broadcast requirements:

TABLE 2

| # | Text displayed on wheel button | Broadcast condition 1 | Broadcast condition 2 | Broadcast condition 3 | Broadcast condition 4 | Broadcast text | Broadcast requirements |
|---|---|---|---|---|---|---|---|
| | | There is a cat in palyer's view | The cat has no item in his hand | The cat has no shield, poised attack, and excited buff | The player is not in a blinded state | The cat is near me | None |
| | | There is a cat in palyer's view | The cat has an item in his hand | The cat has no shield, poised attack, and excited buff | The player is not in a blinded state | The cat has [item name] in his hand | Read the name of the item in the cat's hand |
| | | There is a cat in palyer's view | The cat has no item in his hand | The cat has shield, poised attack, and excited buff | The player is not in a blinded state | The cat has shield/being poised/being excited | Read the buffs on the cat and broadcast these buffs |
| | | There is a cat in palyer's view | The cat has an item in his hand | The cat has shield, poised attack, and excited buff | The player is not in a blinded state | The cat has [item name] in his hand and has shield/being poised/being excited | Read the name of the item in the cat's hand, read the buffs on the cat and broadcast these buffs |
| 2 | My items | The player has an item in his hand | The player does not carry a drink | | | I have [item name] | Read the name of the item in the hand |
| | | The player has no item in his hand | The player carries a drink | | | I have [drink name] | Read the name of the carried drink |
| | | The player has an item in his hand | The player carries a drink | | | I have [item name] and [drink name] | Read the name of the item in the hand, and read the name of the carried drink |
| 3 | Items found | Whether there are the following items in a small area around the player (not in the character's hand): drinks, large vases, | | | | I have [items names] (list the names, only one will be broadcast for the same item, and up to three items will be broadcast) | Read the names of these items, and up tp three items with different names are read |

TABLE 2-continued

| # | Text displayed on wheel button | Broadcast condition 1 | Broadcast condition 2 | Broadcast condition 3 | Broadcast condition 4 | Broadcast text | Broadcast requirements |
|---|---|---|---|---|---|---|---|
| | | gray vases, large bombs, toy guns | | | | | |
| 4 | Active skill | Active skill not learned | | | | My active skill is not learned | None |
| | Active skill | Active skill learned | Active skill has been cooled down | | | My active skill[name][level] is ready | Read the name and the level of the active skill |
| | Active skill | Active skill learned | Active skill has not been cooled down | | | My active skill [name] [level] is available for the remaining [cooling time] | Read the name, level, and remaining cooling time of the active skill (when the broadcast is sent) |
| 5 | Weapon skill | Weapon skill not learned | | | | My weapon skill is not learned | None |
| | Weapon skill | Weapon skill learned | Weapon skill has been cooled down | | | My weapon skill[name][level] is ready | Read the name and the level of the weapon skill |
| | Weapon skill | Weapon skill learned | Weapon skill has not been cooled down | | | My weapon skill [name] [level] is available for the remaing [cooling time] | Read the name, level, and remaining cooling time of the weapon skill (when the broadcast is sent) |
| 6 | My knowledge cards | At least one of "Iron Blood", "Fearless", and "Self-sacrifice" knowledge cards is carried | | | | Cooled down: [knowledge card name] is ready Uncooled: [knowledge card name] is available for the reaminig [cooling time] When more than one of "Iron Blood", "Fearless", and "Self-sacrifice" is carried, it is necessary to continuously describe each knowledge card in the same broadcast | Read whether the corresponding skill has been cooled |

Figure 5C:
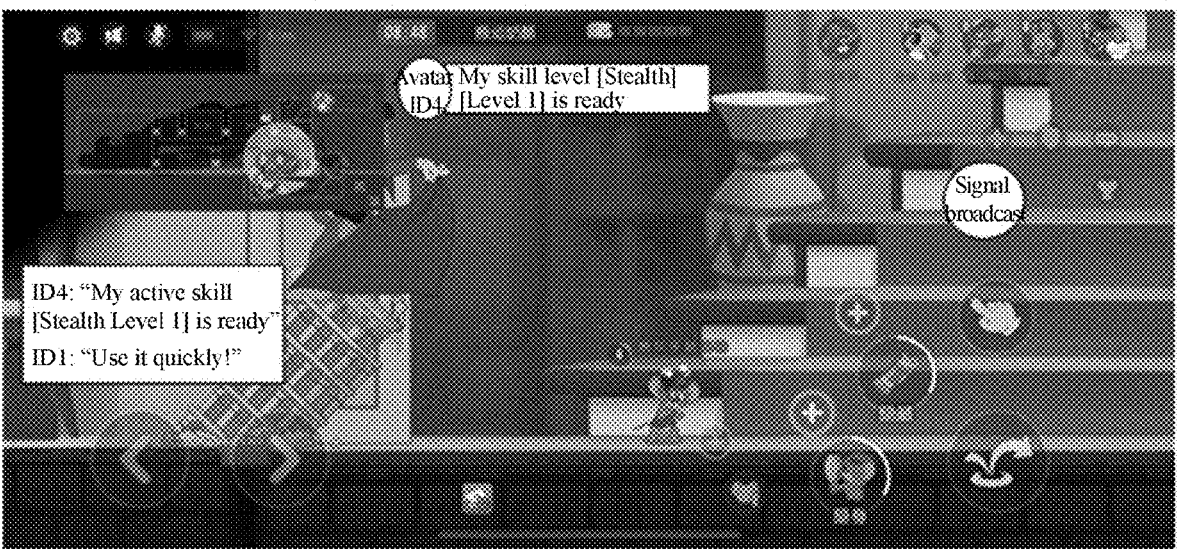

As shown in FIG. 5b, when the user player selects the target broadcast option "Active skill" (as indicated by the shaded part) in the signal broadcast wheel corresponding to the current state "actionable" of the virtual character, the system will automatically determine the target broadcast message according to the current game information (i.e., one or more preset broadcast conditions). It is firstly determined whether the broadcast condition 1 "Active skill learned" is satisfied. If the above determination is yes, it is then determined whether the broadcast condition 2 "Active skill has been cooled down" is satisfied. If it is still yes, the target broadcast message is determined as "My active skill [name] [level] is ready" from one or more broadcast messages corresponding to the broadcast option. Then, it is known that there are broadcast requirements for the target broadcast message—read the name and level of the active skill. The broadcast data is then read from the client or server according to the broadcast requirements—the name of the active skill is "Stealth" and the level of the active skill is "Level 1", and the data is written into the above mentioned target broadcast message—"My active skill [Stealth] [Level 1] is ready". Finally, as shown in FIG. 5c, the determined target broadcast message is sent out.

Figure 6A:
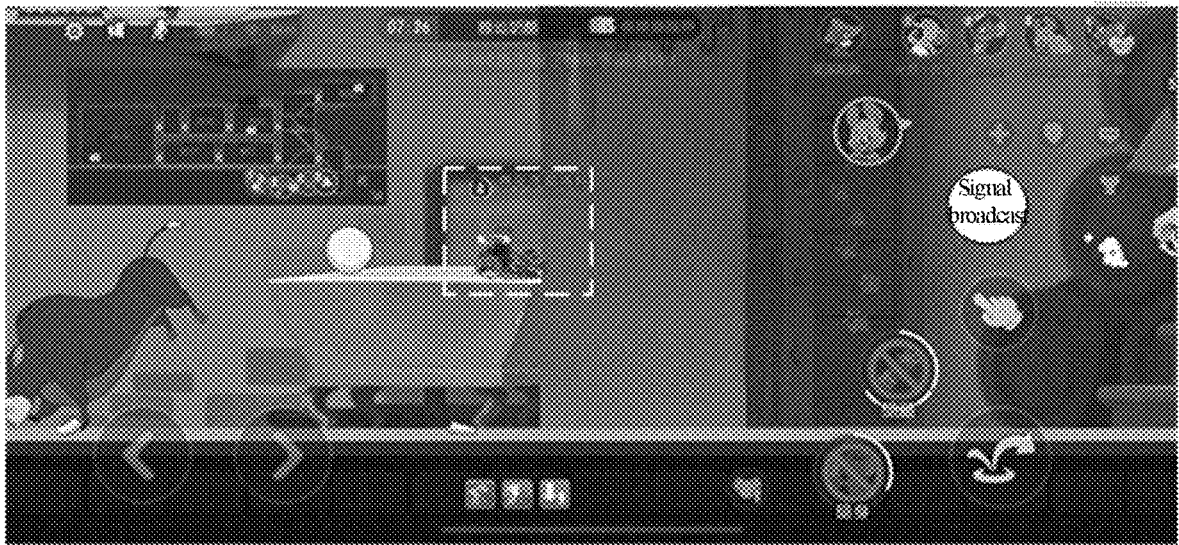
Figure 6B:
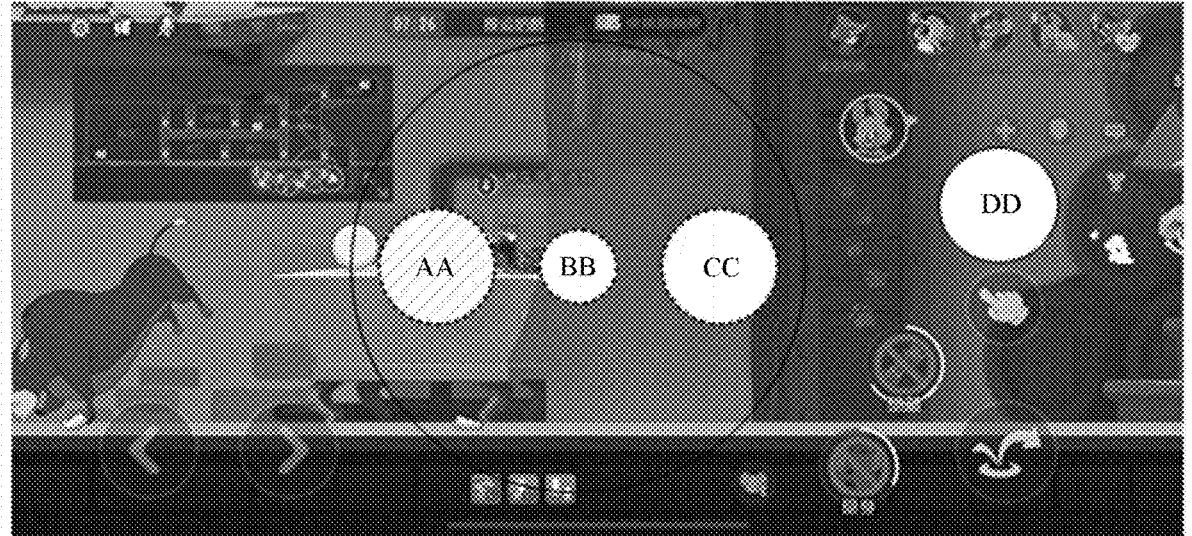

FIG. 6 shows a schematic diagram of providing a corresponding set of broadcast options according to a third state of the virtual character according to one or more embodiments of the present disclosure. As shown in FIG. 6a, the current state (i.e., the third state) of the master virtual character (in the dotted box position) is "unconscious". When the signal broadcast control on the user interface is touched, as shown in FIG. 6b, the signal broadcast control will be registered as the signal broadcast operation area (i.e., the mapping operation area), and the signal broadcast wheel (i.e., the wheel mapping area) will be provided in the center portion of the user interface. The signal broadcast wheel "Struggling progress", "The cat changed tying", and "The cat is tied to the old rocket".

Taking one of the states of the virtual character—"caught by the cat", as an example, the following table illustrates the relationship among broadcast options, one or more broadcast conditions, broadcast messages, and broadcast requirements:

TABLE 3

| # | Text displayed on wheel button | Broadcast condition 1 | Broadcast condition 2 | Broadcast condition 3 | Broadcast condition 4 | Broadcast text | Broadcast requirements |
|---|---|---|---|---|---|---|---|
| 1 | Caught by the cat | The cat has an item in his hand | The cat has no shield, poised attack, and excited buff | | | The cat has [item name] in his hand | Read the name of the item in the cat's hand |
| | | The cat has no item in his hand | The cat has shield, poised attack, and excited buff | | | The cat has shield/being poised/being excited | Read the buffs on the cat and broadcast these buffs |
| | | The cat has an item in his hand | The cat has shield, poised attack, and excited buff | | | The cat has [item name] in his hand and has shield/being poised/being excited | Read the name of the item in the cat's hand, read the buffs on the cat and broadcast these buffs |
| 2 | Struggling progress | Sent directly without requirement | | | | I have struggled [struggling process percentage] | Read the struglling process |
| 3 | The cat changed tying | Sent directly without requirement | | | | The cat changed tying to the new rocket | None |
| 4 | The cat is tied to the old rocket | Sent directly without requirement | | | | The cat is tied back to the old rocket | None | contains two signal broadcast options corresponding to the state of "unconscious", i.e., "The cat is near me" and "Items found".

Figure 6C:
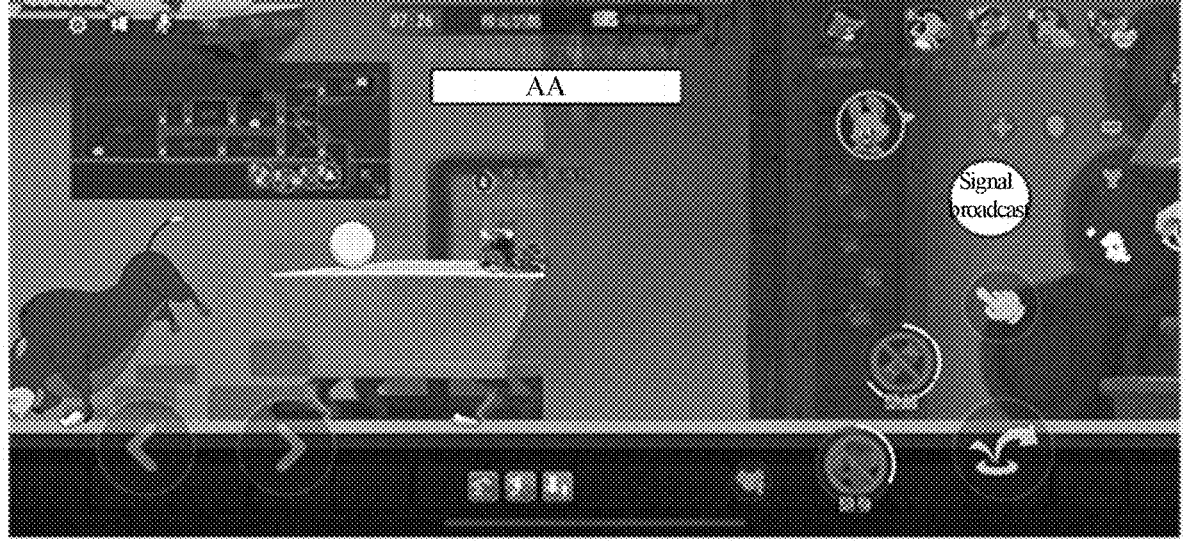

As shown in FIG. 6b, when the user player selects the target broadcast option "The cat is near me" (as indicated by the shaded part) in the signal broadcast wheel corresponding to the current state "Unconscious" of the virtual character, the system will automatically determine the target broadcast message according to the current game information (i.e., one or more preset broadcast conditions). It is firstly determined whether the broadcast condition "There is a cat in player's view" is satisfied. If not, the broadcast condition is not satisfied, and the user player is prompted with "The condition is not met, the broadcast failed!", as shown in FIG. 6c.

Figure 7A:
Figure 7B:
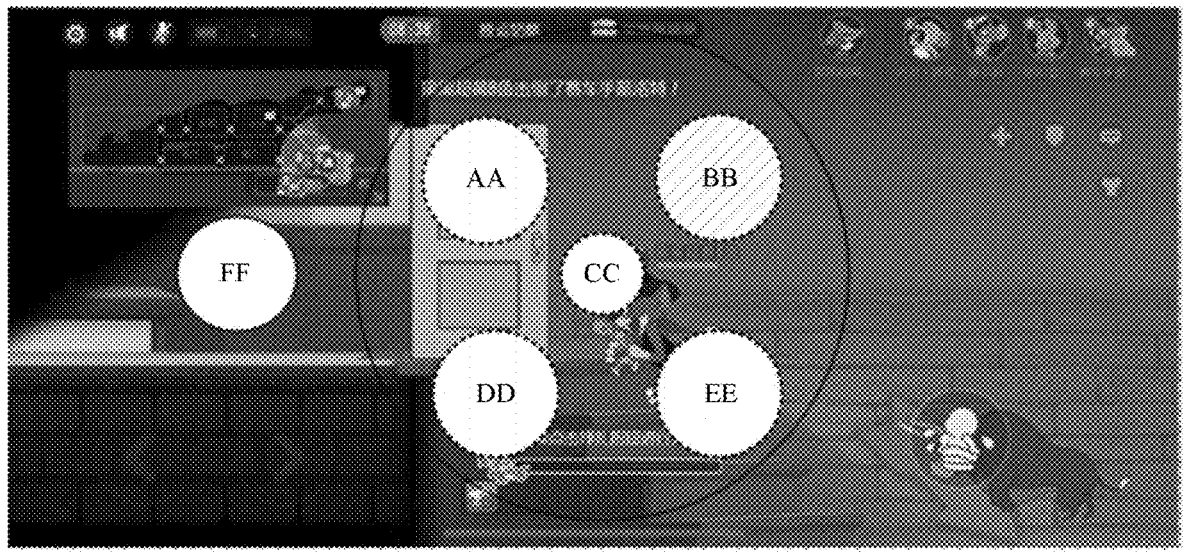
Figure 7C:

FIG. 7 shows a schematic diagram of providing a corresponding set of broadcast options according to a fourth state of the virtual character according to one or more embodiments of the present disclosure. As shown in FIG. 7a, the current state (i.e., the fourth state) of the master virtual character (in the dotted box position) is "caught by the cat". When the signal broadcast control on the user interface is touched, as shown in FIG. 7b, the signal broadcast control will be registered as the signal broadcast operation area (i.e., the mapping operation area), and the signal broadcast wheel (i.e., the wheel mapping area) will be provided in the center portion of the user interface. The signal broadcast wheel contains four signal broadcast options corresponding to the state of "caught by the cat", i.e., "Caught by the cat", As shown in FIG. 7b, when the user player selects the target broadcast option "Struggling progress" (as indicated by the shaded part) in the signal broadcast wheel corresponding to the current state "Caught by the cat" of the virtual character, the system will automatically determine the target broadcast message according to the current game information (i.e., one or more preset broadcast conditions). It is firstly determined that the broadcast message may be sent without broadcast requirement. Then, the target broadcast message is determined as "have struggled [struggling process percentage]". After that, it is known that there is a broadcast requirement for the target broadcast message— read the struggling process bar. The broadcast data is then read from the client or server according to the broadcast requirements—struggling progress is 0%, and the data is written into the above mentioned target broadcast message—"have struggled [0%]". Finally, as shown in FIG. 7c, the determined target broadcast message is sent out.

Figure 8A:
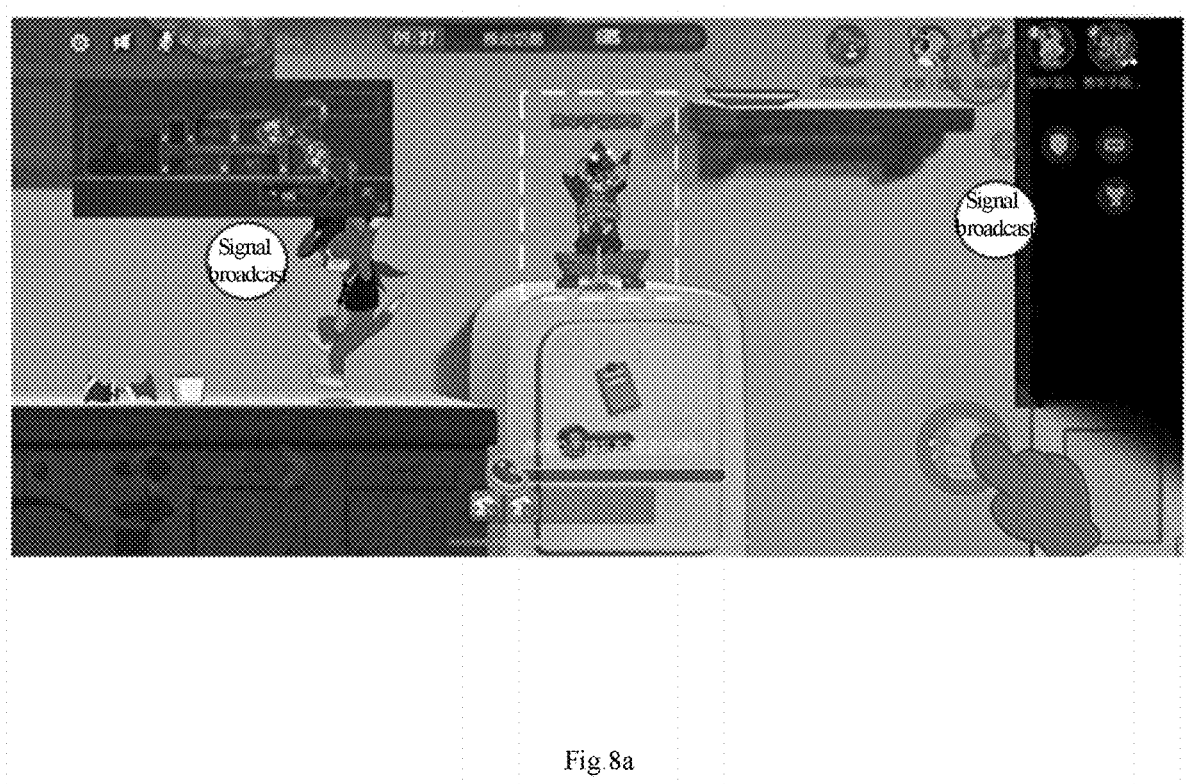
Figure 8B:
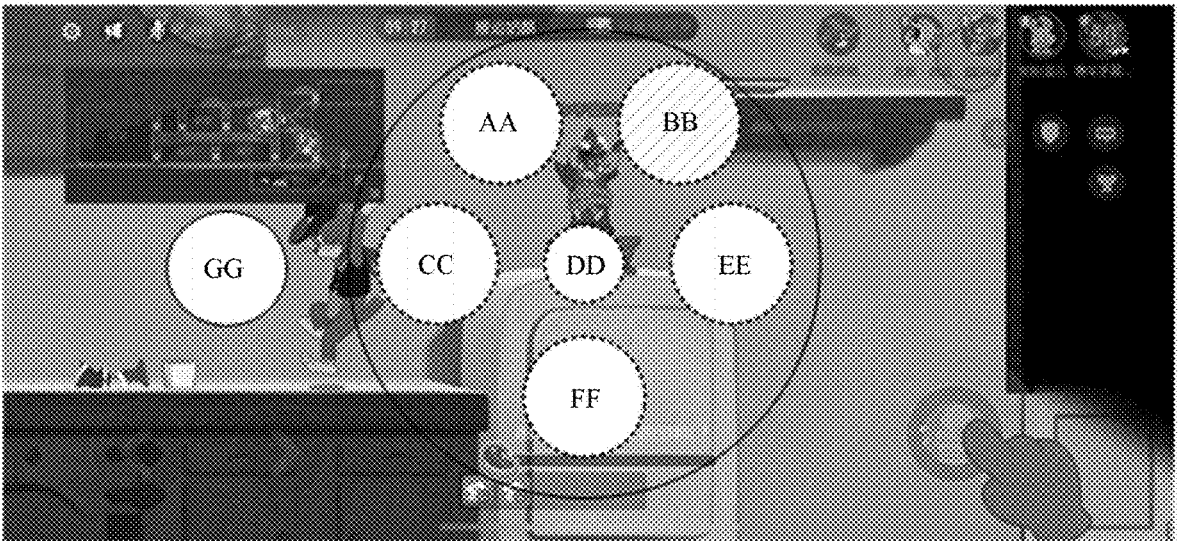

FIG. 8 shows a schematic diagram of providing a corresponding set of broadcast options according to a fifth state of the virtual character in one or more embodiments of the present disclosure. As shown in FIG. 8a, the current state (i.e., the fifth state) of the master virtual character (in the dotted box position) is "tied to the rocket". When the signal broadcast control on the user interface is touched, as shown in FIG. 8b, the signal broadcast control will be registered as the signal broadcast operation area (i.e., the mapping operation area), and the signal broadcast wheel (i.e., the wheel mapping area) will be provided in the center portion of the user interface. The signal broadcast wheel contains five signal broadcast options corresponding to the state of "tied to the rocket", i.e., "The cat is near me", "The cat is not around", "There is a mousetrap", "There is no mousetrap" and "My knowledge cards".

Taking one of the states of the virtual character—"tied to the rocket", as an example, the following table illustrates the relationship among broadcast options, one or more broadcast conditions, broadcast messages, and broadcast requirements:

a display module 910, configured to display a user interface comprising at least one virtual control and at least one virtual character on a user terminal, where the at least one virtual control includes a signal broadcast control, and the at least one virtual character includes a master virtual character; and a provision module 920, configured to provide different sets of broadcast options on the user interface according to different states of the master virtual character in response to a first touch operation on the signal broad-

TABLE 4

| # | Text displayed on wheel button | Broadcast condition 1 | Broadcast condition 2 | Broadcast condition 3 | Broadcast condition 4 | Broadcast text | Broadcast requirements |
|---|---|---|---|---|---|---|---|
| 1 | The cat is near me | The cat has no item in his hand | The cat has no shield, poised attack, and excited buff | | | The cat is near me | None |
| | | The cat has an item in his hand | The cat has no shield, poised attack, and excited buff | | | The cat is near me and has [item name] in his hand | Read the name of the item in the cat's hand |
| | | The cat has no item in his hand | The cat has shield, poised attack, and excited buff | | | The cat is near me and has shield/being poised/being excited | Read the buffs on the cat and broadcast these buffs |
| | | The cat has an item in his hand | The cat has shield, poised attack, and excited buff | | | The cat is near me, has [item name] in his hand and has shield/being poised/being excited | Read the name of the item in the cat's hand, read the buffs on the cat and broadcast these buffs |
| 2 | The cat is not around | Sent directly without requirement | | | | The cat is not around me | None |
| 3 | There is a mousetrap | Sent directly without requirement | | | | There is a mousetrap nearby | None |
| 4 | There is no mousetrap | Sent directly without requirement | | | | There is no mousetrap | None |
| 5 | My knowledge | The knowledge card "save me" is carried | | | | I takes the knowledge card "save me" | None |
| | cards | The knowledge card "save me" is not carried | | | | I do not have the knowledge card "save me" | None |

Figure 8C:

As shown in FIG. 8*b*, when the user player selects the target broadcast option "There is no mousetrap" (as indicated by the shaded part) in the signal broadcast wheel corresponding to the current state "tied to the rocket" of the virtual character, the system will automatically determine the target broadcast message according to the current game information (i.e., one or more preset broadcast conditions). It is firstly determined that the broadcast message may be sent without broadcast requirement. Then, the target broadcast message is determined as "There is no mousetrap". After that, it is known that there is no broadcast requirement for the target broadcast message. Finally, as shown in FIG. 8*c*, the target broadcast message that the broadcast data does not need to be written thereto is directly sent out.

Figure 9A:
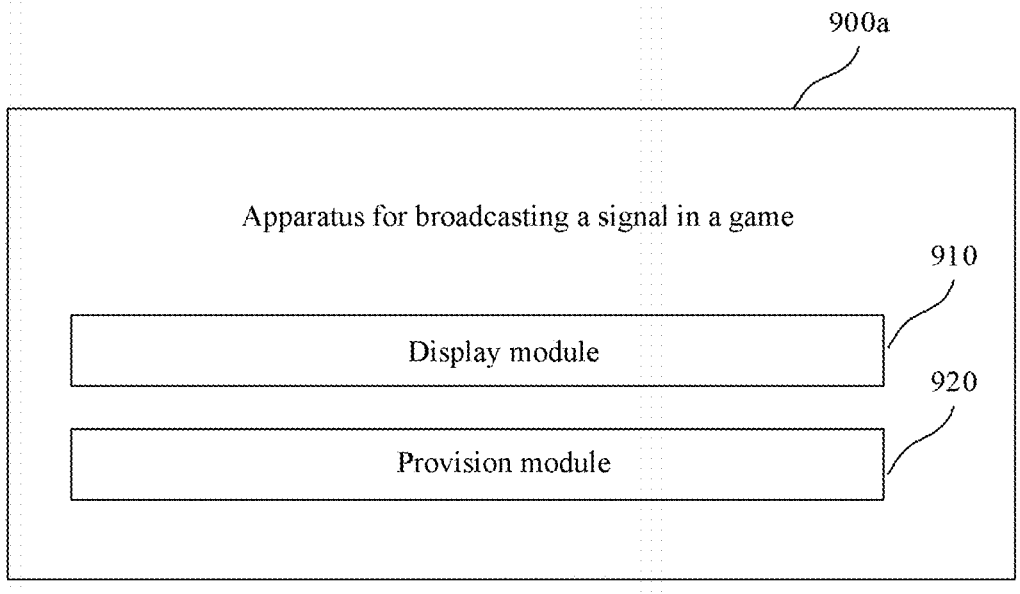
FIG. 9 schematically shows a block diagram of an apparatus for broadcasting a signal in a game according to some embodiments of the present disclosure.

In some embodiments of the present disclosure, an apparatus for broadcasting a signal in a game is further provided. Referring to FIG. 9*a*, the apparatus 900*a* may include:

cast control, where each set of the different sets of broadcast options comprises one or more broadcast options, and each broadcast option corresponds to one or more broadcast messages to be sent.

Figure 9B:
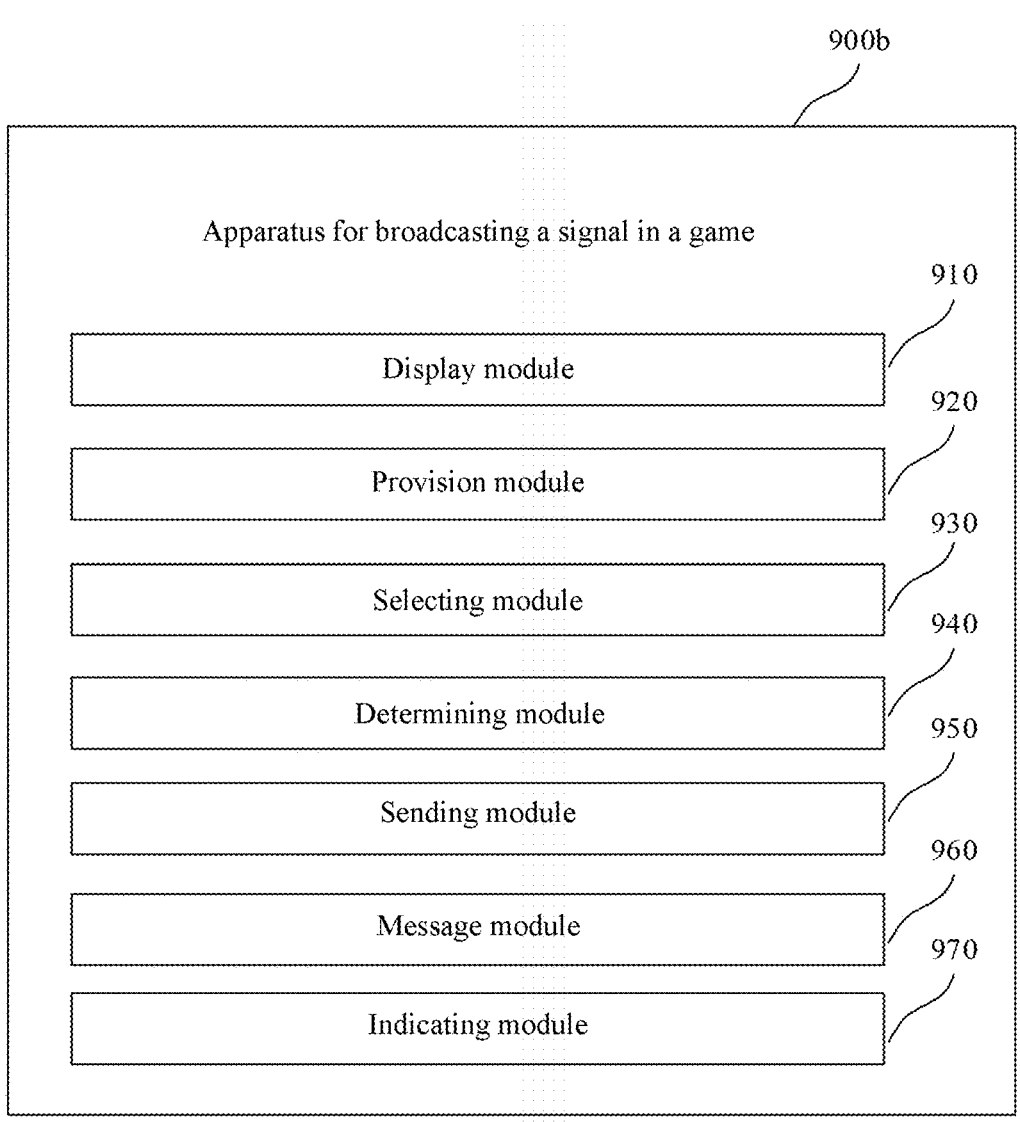

In some embodiments, as shown in FIG. 9*b*, the apparatus 900*b* may further include:

a selecting module 930, configured to select a target broadcast option in response to a second touch operation on the set of broadcast options;

a determining module 940, configured to determine a target broadcast message from one or more broadcast messages corresponding to the target broadcast option based on current game information;

a sending module 950, configured to send the target broadcast message to allies, enemies, or all players;

a message module 960, configured to display the target broadcast message on a user interface of a client that receives the target broadcast message; and an indicating module 970, configured to indicate a position of the master virtual character on a user interface of a client that receives the target broadcast message.

It should be understood that the apparatus 900*a/b* in FIG. 9*a/b* is only an example, and the arrangement sequence and necessity of each module therein are not limited thereto. For example, a certain module(s) may not necessarily exist, or the functions of a certain module(s) may be implemented by another module(s) instead.

In some embodiments of the present disclosure, an electronic device configured to implement the above method is further provided.

Those skilled in the art can understand that various aspects of the present disclosure may be implemented as a system, method or program product. Therefore, various aspects of the present disclosure may be embodied in the following forms, namely: a complete hardware implementation, a complete software implementation (including firmware, microcode, etc.), or a combination of hardware and software implementations, which may be collectively referred to herein as "circuit", "module", or "system".

An electronic device 1000 according to an embodiment of the present disclosure is described below with reference to FIG. 10. The electronic device 1000 shown in FIG. 10 is only an example, and should not limit the functions and usage scope of embodiments of the present disclosure.

Figure 10:
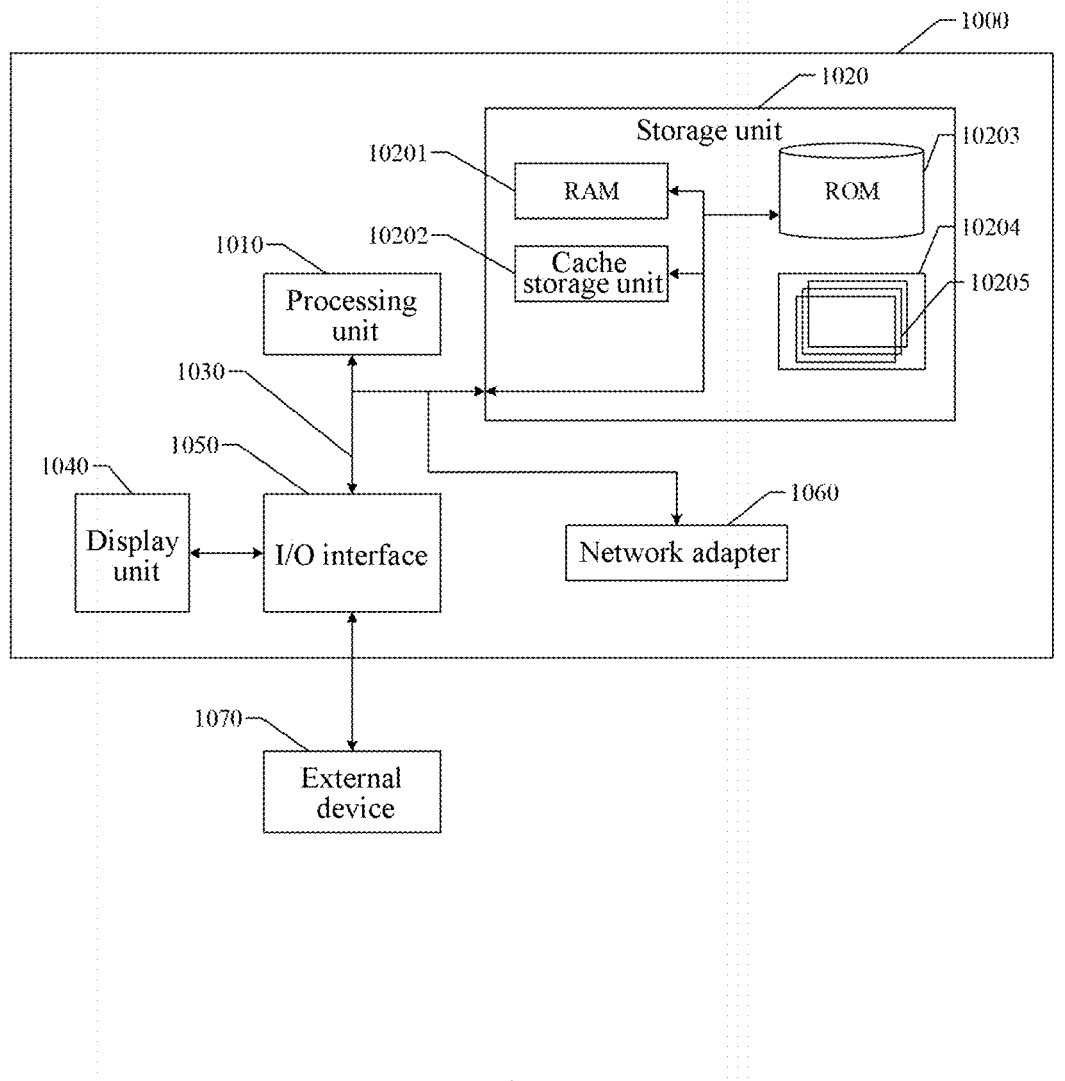
FIG. 10 schematically shows a schematic structural diagram of an electronic device according to some embodiments of the present disclosure.

As shown in FIG. 10, the electronic device 1000 takes the form of a general-purpose computing device. The components of the electronic device 1000 may include, but are not limited to: at least one processing unit 1010 described above, at least one storage unit 1020 described above, a bus 1030 connecting different system components (including the storage unit 1020 and the processing unit 1010), and a display unit 1040.

The storage unit stores program codes, and the program codes may be executed by the processing unit 1010, so that the processing unit 1010 performs the steps according to various embodiments of the present disclosure described in the "Detailed Description" section of this specification. For example, the processing unit 1010 may perform the steps shown in FIG. 2.

The storage unit 1020 may include a readable medium in the form of volatile storage unit, such as a random access storage unit (RAM) 10201 and/or a cache storage unit 10202, and may further include a read-only storage unit (ROM) 10203.

The storage unit 1020 may also include a program or utility 10204 having a set of (at least one) program modules 10205. Such program modules 10205 including but not limited to: an operation system, one or more application programs, other program modules, and program data. Implementations of the networked environments may be included in each or some combination of these examples.

The bus 1030 may represent one or more of several types of bus structures, including a storage unit bus or storage unit controller, a peripheral bus, an accelerated graphics port, a processing unit, or a local bus using any of a variety of bus structures.

The electronic device 1000 may also communicate with one or more external devices 1070 (such as keyboards, pointing devices, Bluetooth devices, etc.), and may also communicate with one or more devices that enable the user to interact with the electronic device 1000, and/or communicate with any device (e.g., router, modem, etc.) that enables the electronic device 1000 to communicate with one or more other computing devices. Such communication may occur through the input/output (I/O) interface 1050. Moreover, the electronic device 1000 may also communicate with one or more networks (such as a local area network (LAN), a wide area network (WAN), and/or a public network such as the Internet) through the network adapter 1060. As shown, the network adapter 1060 communicates with other modules of the electronic device 1000 through the bus 1030. It should be appreciated that although not shown, other hardware and/or software modules may be used in conjunction with the electronic device 1000, including but not limited to: microcodes, device drivers, redundant processing units, external disk drive arrays, RAID systems, tape drives, and data backup storage system, etc.

Through the description of the above implementations, those skilled in the art can easily understand that the example implementations described here may be implemented by software, or by a combination of software and necessary hardware. Therefore, the technical solutions according to embodiments of the present disclosure may be embodied in the form of software products, and the software products may be stored in a non-volatile storage medium (which may be CD-ROM, U disk, mobile hard disk, etc.) or on the network, including several instructions to enable a computing device (which may be a personal computer, a server, a terminal device, or a network device, etc.) to perform the method according to embodiments of the present disclosure.

In some embodiments of the present disclosure, there is also provided a computer-readable storage medium, on which a program product capable of implementing the above-mentioned method in this specification is stored. In some possible implementations, various aspects of the present disclosure may also be implemented in the form of program product, which includes program codes. When the program product runs on the terminal device, the program codes are used to enable the terminal device to perform the above-mentioned steps according to various embodiments of the present disclosure described in the "Detailed Description" section.

Figure 11:
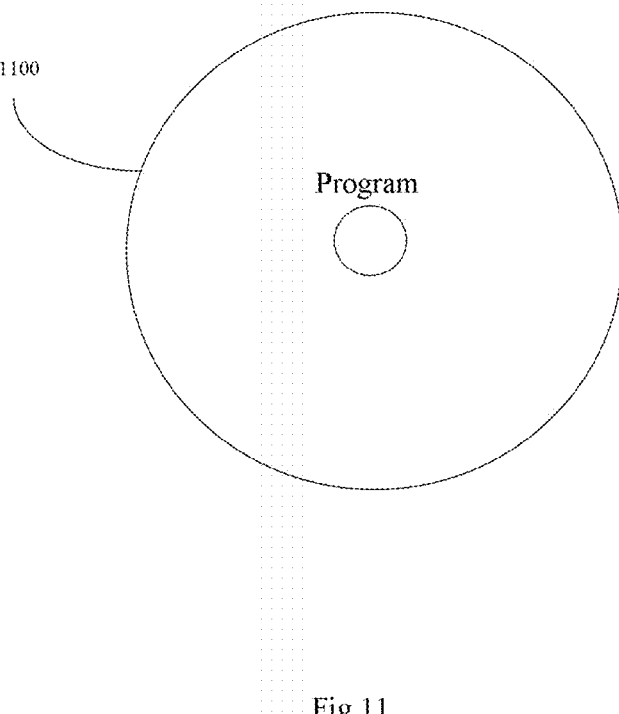
FIG. 11 schematically shows a program product according to some embodiments of the present disclosure.

As shown in FIG. 11, a program product 1100 for implementing the above method according to an embodiment of the present disclosure is described, which may adopt a portable compact disk read-only memory (CD-ROM) and include program codes, and may be running on a terminal device, for example on a personal computer. However, the program product of the present disclosure is not limited thereto. In this document, a readable storage medium may be any tangible medium containing or storing a program, and the program may be used by or in combination with an instruction execution system, apparatus, or device.

A program product may take the form of any combination of one or more readable media. The readable medium may be a readable signal medium or a readable storage medium. The readable storage medium may be, for example, but not limited to, an electrical, magnetic, optical, electromagnetic, infrared, or semiconductor system, apparatus, or device, or any combination thereof. More specific examples (non-exhaustive list) of readable storage media include: an electrical connection with one or more conductors, a portable disk, a hard disk, a random access memory (RAM), a read only memory (ROM), an erasable programmable read-only memory (EPROM or flash memory), an optical fiber, a portable compact disk read-only memory (CD-ROM), an optical storage device, a magnetic storage device, or any suitable combination of the foregoing.

A computer readable signal medium may include a data signal carrying readable program codes in baseband or as part of a carrier wave. Such propagated data signal may take many forms, including but not limited to an electromagnetic signal, an optical signal, or any suitable combination of the foregoing. A readable signal medium may also be any readable medium other than a readable storage medium, and the readable medium may transmit, propagate, or transport a program for use by or in conjunction with an instruction execution system, apparatus, or device.

The program codes embodied on a readable medium may be transmitted using any appropriate medium, including but not limited to wireless, wireline, optical fiber cable, RF, etc., or any suitable combination of the foregoing.

The program codes for performing operations of the present disclosure may be written in any combination of one or more programming languages, including an object-oriented programming language—such as Java, C++, etc., as well as a conventional procedural programming language—such as "C" or similar programming language. The program codes may execute entirely on the user's computing device, partly on the user device, as a stand-alone software package, partly on the user's computing device and partly on a remote computing device, or entirely on the remote computing device or a server. In cases involving a remote computing device, the remote computing device may be connected to the user computing device through any kind of network, including a local area network (LAN) or a wide area network (WAN), or may be connected to an external computing device (e.g., using an Internet service provider to connect via the Internet).

In addition, the above-mentioned drawings are only schematic illustrations of processes included in the method according to some embodiments of the present disclosure, and are not intended to be limiting. It is easy to understand that the processes shown in the above figures do not imply or limit the chronological order of these processes. In addition, it is also easily understood that these processes may be executed synchronously or asynchronously in multiple modules, for example.

It should be noted that although several modules or units of the device for performing actions are mentioned in the above detailed description, this division is not mandatory. Actually, according to an embodiment of the present disclosure, the features and functions of two or more modules or units described above may be embodied in one module or unit. Conversely, the features and functions of one module or unit described above may be further divided to be embodied by a plurality of modules or units.

Other embodiments of the present disclosure will be readily apparent to those skilled in the art after consideration of the specification and practice of the contents disclosed herein. The present disclosure is intended to cover any modification, usage or adaptation of the present disclosure. These modifications, usages, or adaptations follow the general principle of the present disclosure and include common knowledge or conventional technical means in the technical field not disclosed in the present disclosure. The specification and examples are to be considered exemplary only, with the true scope and spirit of the present disclosure indicated by the appended claims.

It should be understood that the present disclosure is not limited to the precise constructions which have been described above and shown in the drawings, and various modifications and changes may be made without departing from the scope thereof. The scope of the present disclosure is limited only by the appended claims.

24

What is claimed is:

1. A method for broadcasting a signal in a game, the method comprising:
displaying, on a terminal, a user interface comprising at least one virtual control and at least one virtual character, wherein the at least one virtual control comprises a signal broadcast control, and the at least one virtual character comprises a master virtual character; and
providing different sets of broadcast options on the user interface according to different states of the master virtual character, in response to a first touch operation on the signal broadcast control, wherein each set of the different sets of broadcast options comprises one or more broadcast options, and each broadcast option corresponds to one or more broadcast messages to be sent,
wherein the providing different sets of broadcast options on the user interface according to different states of the master virtual character, in response to the first touch operation on the signal broadcast control, comprises:
in response that a set of broadcast options corresponding to a first state of the master virtual character is provided on the user interface and that the master virtual character switches from the first state to a second state, stopping providing the set of broadcast options; and
re-providing a set of broadcast options corresponding to the second state of the master virtual character on the user interface, in response to the first touch operation on the signal broadcast control again.

2. The method according to claim 1, further comprising:
selecting a target broadcast option in response to a second touch operation on the set of broadcast options; and
determining a target broadcast message from one or more broadcast messages corresponding to the target broadcast option based on current game information.

3. The method according to claim 2, further comprising:
sending the target broadcast message to allies, enemies, or all players in a field of view of the master virtual character in the user interface.

4. The method according to claim 3, further comprising:
displaying the target broadcast message on a user interface of a client that receives the target broadcast message.

5. The method according to claim 3, further comprising:
indicating a position of the master virtual character on a user interface of a client that receives the target broadcast message.

6. The method according to claim 2, wherein
the first touch operation and the second touch operation are continuous touch operations; and
wherein the providing different sets of broadcast options on the user interface according to different states of the master virtual character, in response to the first touch operation on the signal broadcast control, further comprises:
providing a signal broadcast wheel on the user interface, wherein each cell in the signal broadcast wheel corresponds to each of the one or more broadcast options.

7. The method of claim 6, wherein
the second touch operation is a mapping operation; and
wherein the selecting the target broadcast option in response to the second touch operation on the set of broadcast options comprises:
registering the signal broadcast control as a mapping operation area and registering the signal broadcast wheel as a wheel mapping area on the user interface, wherein a position of a touch point of a mapping operation in the mapping operation area is synchronously mapped to the wheel mapping area, so that the target broadcast option in the signal broadcast wheel is selected through a release position of the mapping operation.

8. The method of claim 6, wherein
the second touch operation is a pointing operation;
wherein the selecting the target broadcast option in response to the second touch operation on the set of broadcast options comprises:
receiving the pointing operation on the user interface to select the target broadcast option in the signal broadcast wheel, wherein a sliding start point of the pointing operation is the signal broadcast control and a sliding end point of the pointing operation is any cell in the signal broadcast wheel.

9. The method according to claim 2, wherein the determining the target broadcast message from one or more broadcast messages corresponding to the target broadcast option based on current game information comprises:
determining whether one or more preset broadcast conditions are satisfied according to the game information, and
determining the target broadcast message from the one or more broadcast messages corresponding to the target broadcast option based on a satisfaction situation of the one or more broadcast conditions.

10. The method according to claim 9, wherein the determining the target broadcast message from the one or more broadcast messages corresponding to the target broadcast option based on the satisfaction situation of the one or more broadcast conditions comprises:
selecting a broadcast message, for which all the broadcast conditions are satisfied, from the one or more broadcast messages as the target broadcast message.

11. The method according to claim 2, wherein the determining the target broadcast message from the one or more broadcast messages corresponding to the target broadcast option based on current game information further comprises:
acquiring preset broadcast data from the game information according to broadcast requirements of the target broadcast message, and
writing the broadcast data and/or broadcast content corresponding to the broadcast data into the target broadcast message.

12. The method according to claim 1, wherein the signal broadcast control comprises at least one or more of the following characteristics:
being located in one or more areas of the user interface;
having a predetermined maximum number of usages; and
indicating a remaining number of usages, wherein:
the remaining number of usages is increased by one after a predetermined period in response to the remaining number of usages being greater than or equal to zero and less than the predetermined maximum number of usages; and
the signal broadcast control is disabled until the predetermined period is reached in response to the remaining number of usages being equal to zero.

13. An electronic device, comprising:
a memory, configured to store a computer-executable program; and
a processor, configured to execute the computer-executable program stored on the memory to perform a method for broadcasting a signal in a game, the method comprising:

displaying, on a user terminal, a user interface comprising at least one virtual control and at least one virtual character, wherein the at least one virtual control comprises a signal broadcast control, and the at least one virtual character comprises a master virtual character; and
providing different sets of broadcast options on the user interface according to different states of the master virtual character, in response to a first touch operation on the signal broadcast control, wherein each set of the different sets of broadcast options comprises one or more broadcast options, and each broadcast option corresponds to one or more broadcast messages to be sent,
wherein the providing different sets of broadcast options on the user interface according to different states of the master virtual character, in response to the first touch operation on the signal broadcast control, comprises:
in response that a set of broadcast options corresponding to a first state of the master virtual character is provided on the user interface and that the master virtual character switches from the first state to a second state, stopping providing the set of broadcast options; and
re-providing a set of broadcast options corresponding to the second state of the master virtual character on the user interface, in response to the first touch operation on the signal broadcast control again.

14. A computer-readable storage medium, wherein a computer-executable program is stored on the computer-readable storage medium, and the computer-executable program is configured to, when loaded and executed by a processor, implement a method for broadcasting a signal in a game, the method comprising:
displaying, on a user terminal, a user interface comprising at least one virtual control and at least one virtual character, wherein the at least one virtual control comprises a signal broadcast control, and the at least one virtual character comprises a master virtual character; and
providing different sets of broadcast options on the user interface according to different states of the master virtual character, in response to a first touch operation on the signal broadcast control, wherein each set of the different sets of broadcast options comprises one or more broadcast options, and each broadcast option corresponds to one or more broadcast messages to be sent,
wherein the providing different sets of broadcast options on the user interface according to different states of the master virtual character, in response to the first touch operation on the signal broadcast control, comprises:
in response that a set of broadcast options corresponding to a first state of the master virtual character is provided on the user interface and that the master virtual character switches from the first state to a second state, stopping providing the set of broadcast options; and
re-providing a set of broadcast options corresponding to the second state of the master virtual character on the user interface, in response to the first touch operation on the signal broadcast control again.

15. The method according to claim 6, wherein
the continuous touch operations are touch operations performed by fingers on the user interface, or combination of two or more different touch operations performed simultaneously.

16. The method according to claim 15, wherein
the touch operations comprises at least one of clicking,
   touching, pressing, dragging, and sliding.

17. The method according to claim 2, wherein
the first touch operation comprises a touching operation
   on the signal broadcast control.

18. The method according to claim 17, wherein
the second touch operation comprises a sliding operation
   to prevent a finger from leaving a screen following the
   touching operation.

19. The method according to claim 1, wherein
the set of broadcast options comprises a option list pop-up
   window.

\* \* \* \* \*